US006988272B1

(12) United States Patent
Iwao et al.

(10) Patent No.: US 6,988,272 B1
(45) Date of Patent: Jan. 17, 2006

(54) OBJECT COLLABORATION APPARATUS

(75) Inventors: Tadashige Iwao, Kanagawa (JP); Makoto Okada, Kanagawa (JP); Yuji Wada, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/407,307

(22) Filed: Sep. 29, 1999

(30) Foreign Application Priority Data

Oct. 2, 1998 (JP) ................................. 10-281390

(51) Int. Cl.
*G06F 9/46* (2006.01)
(52) U.S. Cl. ......................... 719/316; 718/102; 705/37
(58) Field of Classification Search ........ 709/100–108, 709/315, 316; 705/37; 718/102–104; 719/315–317; 710/20
See application file for complete search history.

(56) References Cited

U.S. PATENT DOCUMENTS

| | | | | | |
|---|---|---|---|---|---|
| 5,377,350 | A | * | 12/1994 | Skinner ...................... | 709/316 |
| 5,551,035 | A | * | 8/1996 | Arnold et al. ............... | 719/315 |
| 5,794,219 | A | * | 8/1998 | Brown ......................... | 705/37 |
| 5,802,396 | A | * | 9/1998 | Gray ............................. | 710/20 |
| 5,905,975 | A | * | 5/1999 | Ausubel ...................... | 705/37 |
| 6,021,398 | A | * | 2/2000 | Ausubel ...................... | 705/37 |
| 6,161,099 | A | * | 12/2000 | Harrington et al. ........... | 705/37 |
| 6,243,691 | B1 | * | 6/2001 | Fisher et al. .................. | 705/37 |
| 6,415,269 | B1 | * | 7/2002 | Dinwoodie ................. | 705/37 |
| 6,425,016 | B1 | * | 7/2002 | Banavar et al. ............. | 709/310 |
| 6,795,969 | B2 | * | 9/2004 | Gray et al. .................. | 719/317 |

FOREIGN PATENT DOCUMENTS

JP 11-161493 6/1999

OTHER PUBLICATIONS

Chavez et al. "Challenger: Multi-agent System for Distributed Resource Allocation" 1997 ACM, pp. 323-331.*
Veeramani "Task and resource allocation via auctioning" proceedings of the 1992 Winter Simulation Conference, pp. 945-954.*
Tadashige Iwao et al., "Field-Reactor Model For Distributed Objects", *Information Processing Society of Japan*, Jan. 29, 1998.
Tadashige Iwao et al., "Distributed Object Collaboration Using Field Reactor Library", *Multimedia, Distribution, Collaboration and Mobile (DECOMO '99) Symposium*, Jun., 1999.
Makoto Okaga et al., "Loosely-Coupled Collaboration System for Distributed Object Using Awareness Analogy", *Workshop of the Multimedia Communication and Distributed Processing*, Nov. 1998.

* cited by examiner

*Primary Examiner*—Sue Lao
*Assistant Examiner*—Van Nguyen
(74) *Attorney, Agent, or Firm*—Staas & Halsey LLP

(57) ABSTRACT

An object collaboration apparatus is driven by a message action relation, and can dynamically build a collaboration between objects using a bidding system. A task initiator object circulates a requesting message, indicating the service content that the task initiator object wants to request, on a shared communication channel 504, and this requesting message is received by each service object. If an action that is a reaction to the message is listed in a reaction table 703 stored by the service objects, the service objects create and return a bidding message, which includes a bidding value, for example the CPU load ratio, with the bidding portion 707. An arbitrating portion of the initiator object receives all bidding messages in a certain period of time, and, in consideration of parameters such as the bidding value and the communication time between objects, determines and awards the bid to the bid-winning object. Then, it sends out the requested processing information together with the bid awarding message. The bid-winning object processes the requested task with an action execution portion 704.

6 Claims, 22 Drawing Sheets

| Subject | Message | | | Action |
|---|---|---|---|---|
| | Predicate | Object 1 | Object 2 | |
| Object ID | AddItem | * | Object 2 | Add function 1 |
| Object ID | Store | * | * | Application 1 |
| * | Open | * | * | Application 2 |

| Requesting message | | |
|---|---|---|
| Task object ID | Query | Task ID | Service type |

(Note: Requesting message spans: Task object ID | Query | Task ID | Service type)

| | Requesting message | | |
|---|---|---|---|
| Task object ID | Query | Task ID | Service type |

Fig. 10

| | Message | | | Action |
|---|---|---|---|---|
| Subject | Predicate | Object 1 | Object 2 | |
| * | Query | * | * | Bidding portion address |
| Service object ID | Get | * | * | Service executing portion address |

(a) Bidding message

| Service object ID | Bid | Task ID | Service type |
|---|---|---|---|

Bidding message (b) Bid awarding message

| service object ID | Get | Task ID | Service type |
|---|---|---|---|

Bid awarding message

Fig. 11

(a) Requesting message

| Message | |
|---|---|
| Terminal ID | Query | Capacity X |

(b) Disk server object reaction table

| Message | | | Action |
|---|---|---|---|
| Subject | Predicate | Object | |
| * | Query | * | Query function |
| Server object ID | Get | * | Store function |

(c) Bidding message

| Bidding message | | |
|---|---|---|
| Server object ID | Bid | Disk ID | Remaining capacity |

(d) Bid awarding message

| Bid awarding message | | |
|---|---|---|
| Server object ID | Get | Disk ID | Data |

Fig. 14

(a) Requesting message

| Message | |
|---|---|
| Terminal ID | Query |
| | X |

(b) Disk server object reaction table

| Message | | Action |
|---|---|---|
| Subject | Predicate | |
| * | Query | Query function |
| Server object ID | Get | Query function |
| * | * | CPU function |

With Object column:

| Message | | | Action |
|---|---|---|---|
| Subject | Predicate | Object | |
| * | Query | Object 1 | Query function |
| Server object ID | Get | * | Query function |
| * | * | * | CPU function |

(c) Bidding message

| Bidding message | | |
|---|---|---|
| Server object ID | Bid | CPU ID |
| | | CPU power |

(d) Bid awarding message

| Bid awarding message | | |
|---|---|---|
| Server object ID | Get | CPU ID |
| | | Processing data |

Fig. 17

(a)
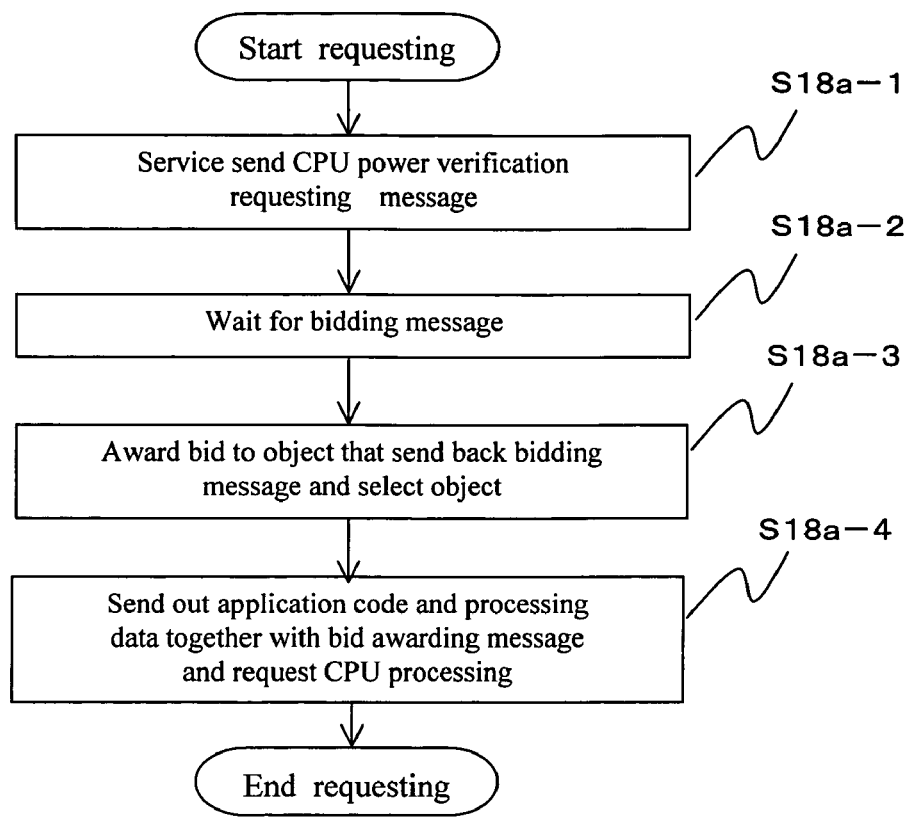
(b)
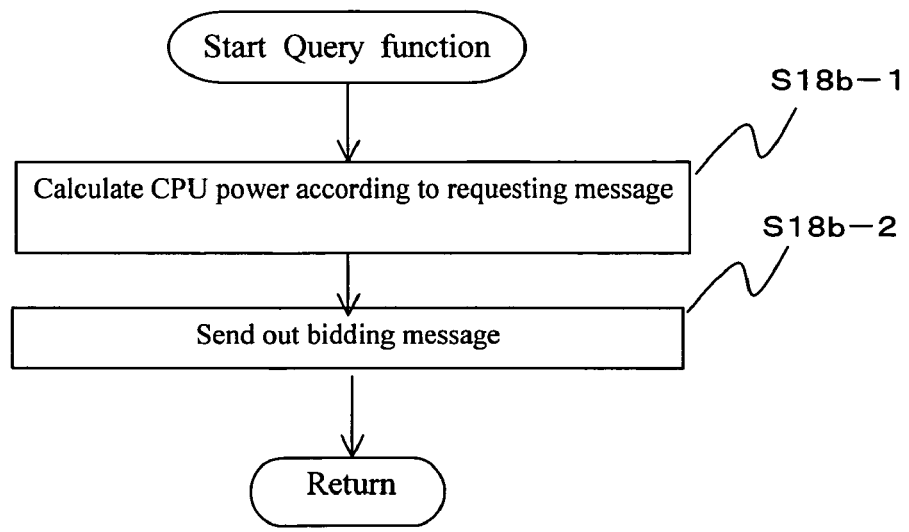
Fig. 18

(a) Requesting message

| Message | |
|---|---|
| Terminal ID | Query | X | * |

(b) Disk server object reaction table

| Message | | | Action | |
|---|---|---|---|---|
| Subject | Predicate | Object 1 | Object 2 | |
| * | Query | * | * | Query function |
| Server object ID | Get | * | * | WWW function |

(c) Bidding message

| Bidding message | | |
|---|---|---|
| Server object ID | Bid | WWW server ID | * |

(d) Bid awarding message

| Bid awarding message | | |
|---|---|---|
| Server object ID | Get | WWW server ID | Processing data |

Fig. 20

(a)
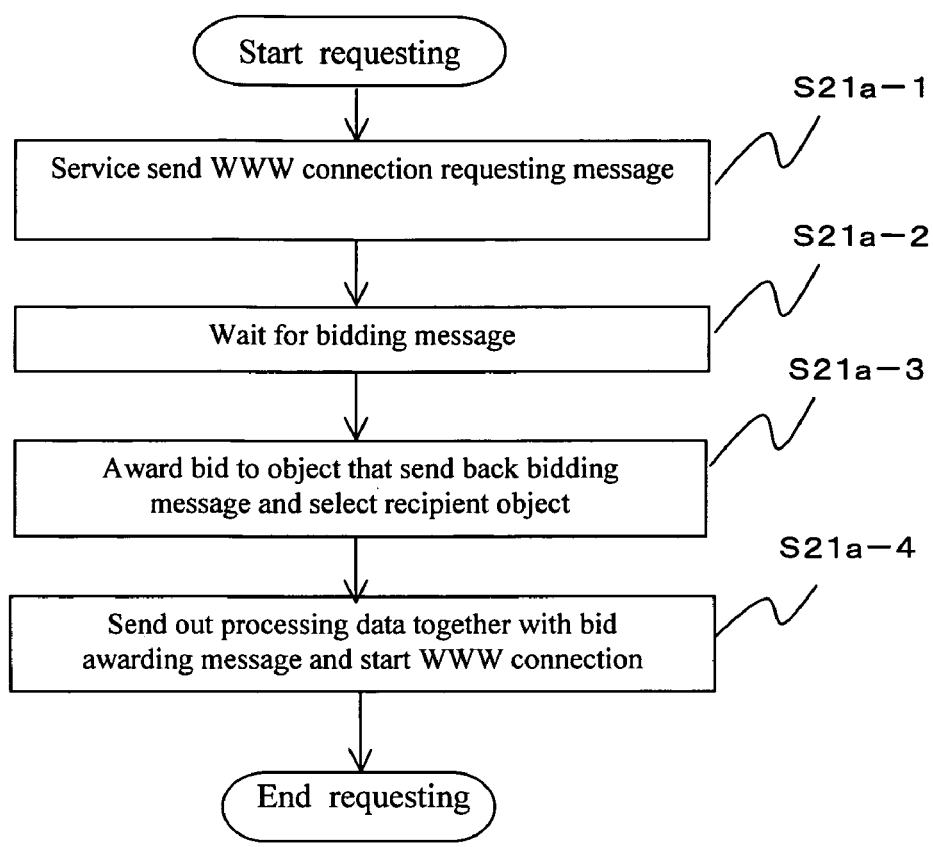
(b)
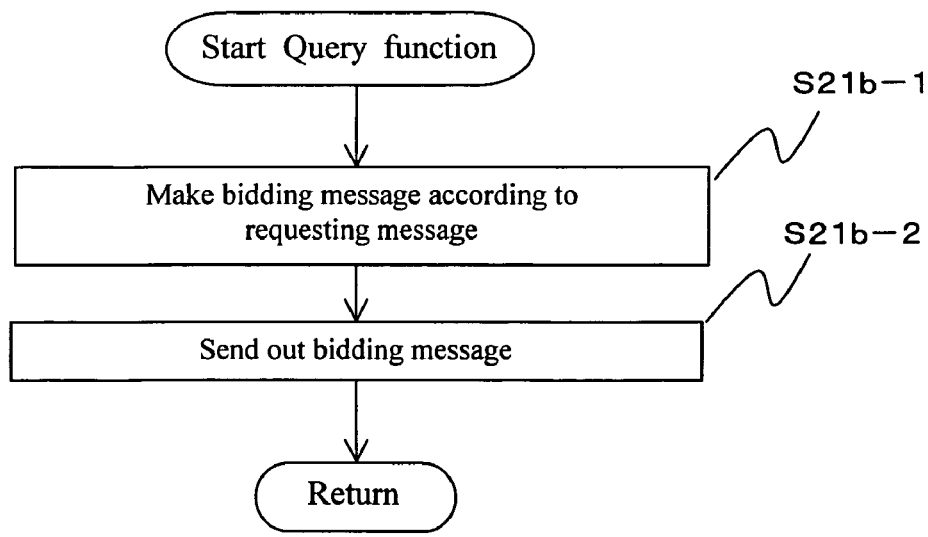
Fig. 21

OBJECT COLLABORATION APPARATUS

BACKGROUND OF THE INVENTION

1. Field of the Invention

The present invention relates to an object collaboration apparatus for performing collaboration processing such as interaction and cooperation among a group of computers or objects. More particularly, the present invention relates to an object collaboration apparatus for providing a system on a computer network that can adjust to environmental changes and progressive system changes flexibly by generating and organizing a plurality of processes dynamically in an object-oriented environment.

2. Description of the Related Art

As the computer networks shave become widespread in recent years, the systems in which a plurality of objects, which are distributed on a computer network, perform a process while collaborating with each other have been increasing. Research for techniques for object collaboration systems focuses mainly on the object oriented programming technologies and software component technology. One example of an object oriented programming technology is CORBA (Common Object Request Broker: Architecture and Specification), which is a common specification for operating distributed objects, issued by the OMG (Object Management Group), which has been established in order to standardize and promote object-oriented technology.

FIG. 23 shows an example of an object collaboration in a client/server system based on CORBA. In this system, a series of processing is conducted by collaboration of a client application and a server application, namely by an object collaboration.

Application developers describe the service interface provided by a client and a server with IDL (Interface Definition Language). The interface is defined by a group of operations that can be requested from an object. For each operation, the name of the operation, parameters, return value, exceptional processing in case of an error, and additional information are defined.

Compiling the content defined with IDL by a specialized compiler forms a stub for a client and a skeleton for a server. The stub is a group of routines that provide a client application with access to a group of operations defined with IDL. In the client application, calling the routine provided by the stub activates the operation. The skeleton provides a dispatching routine to a method routine provided by a server application.

The stub and the skeleton are generated in a programming language which is used by the corresponding client application or server application. For example, if C is used as the programming language, the stub is formed as a group of functions in C. The client application calls the function corresponding to the desired operation, thereby calling the routine corresponding to the server application via the stub, ORB run time and the skeleton. After executing the predetermined processing, the processed result is returned to the client application which originated the call.

Thus, constructing an object collaboration processing has become easier with CORBA. However, when actually trying to construct such an object collaboration processing with CORBA, it is necessary not only to understand the CORBA itself, but also to design the object according to the CORBA specification and define it with IDL. In other words, whoever constructs the system has to fully understand its application method.

It is also necessary to be fully aware of the relationship between the objects. In other words, it is necessary to make clear what kind of processing is conducted by each object, and which transmission parameters are required for the processing.

As the interface between objects has been standardized, the independence of objects has been improved. However the existence of a fixed relationship between these objects is still presupposed.

When thinking of human communication, vague interaction often happens in the real word. For example, when a person tries to solve a problem, he/she utilizes his/her own resources or asks other people for collaboration. In the case of utilizing one's own resources, problem solving is considered from various view points. Also, in the case of asking others for help, it is possible to ask either a specific person for help, or to broadly request collaboration from participants. In the case of broadly asking an unspecified person for collaboration, the reaction of the participants varies in many ways. Some who have a solution or the resources to handle it may present an answer and collaborate. Others may give advice by passing on their own experience and knowledge, even if that does not directly present a solution or provide handling resources. Still others might ignore the inquiry because of their total indifference. In other words, whether the participant reacts to a request or not depends on the participant. Furthermore, when the participant decides to react to the request, how the participant does depends on the participant.

In general, with respect to a request for a job between human beings, when a of plurality participants offer collaboration responding to the request, the initiator of the request selects the most appropriate participant, for example the person with the highest ability or the person most readily available, and assigns the request to that person.

When the human being is replaced with an object here, whether or not each object receives transmitted information or requests for processing, and what kind of processing is conducted in response to the received information will be different. That is to say, in the distributed processing of a task, collaboration with free relationship between objects can be assumed. When a plurality of objects react to the information, it is necessary to detect which objects among an unspecified majority of objects can provide the processing. Furthermore, as these objects dynamically change their own condition, it is necessary to judge which object is appropriate for requesting processing.

In conventional distributed processing methods with object collaboration, the relationships between objects are fixed. Therefore, it was difficult to construct an object collaboration system realizing distributed processing with free relationships between objects.

Thus, in distributed object system technology, for example, in CORBA or DCOM, the framework for providing an object access which is transparent to a network and the framework with regard to interfaces for distributed objects is constantly improving. However, these frameworks are not adequate to answer the question of how dynamically to construct the collaboration between objects.

SUMMARY OF THE INVENTION

In order to solve these problems, it is an object of the present invention to increase the degree of freedom for the collaboration between objects or computers connected to a network, and to provide an object collaboration apparatus for constructing a system in which such collaboration processing such as interaction and cooperation between groups of computers or objects is performed, and, in an object-oriented environment, distributed processing of a task is flexibly executed, and which changes progressively.

To solve the above-noted problems, a first configuration making collaboration between objects more flexible is necessary. Also, a second configuration for detecting objects that can provide processing resources and their conditions, and for selecting the most appropriate object for the requested task processing from among a plurality of detected objects is necessary.

In order to achieve the first configuration mentioned above, it is not enough simply to provide an application as a component, a framework in which objects dynamically provide and organize functions while interacting with each other is necessary. However, when collaborating objects are intimately related, depending on each other's internal condition and function, it is difficult to dynamically construct functions by the interaction of these objects. Therefore, in order to dynamically construct functions by collaboration, it is necessary to define a loosely coupled relationship between collaborating objects.

Considering human communication and human behavior for collaborating with each other, there is a condition called "awareness." One model proposes that exchanging information based on this "awareness" creates the variation and flexibility in human communication behavior.

This "awareness" model acknowledges a condition or exchanging information in which communication entities are not involved directly and purposefully, in addition to the communication behavior. Such "awareness" information, in fact, influences the variations of behavior including the communication behavior.

In the field of distributed object systems technology, if collaboration processing between objects based on detected "awareness" could be performed with information processing similar to the "awareness" between human beings, it should be possible to make the collaboration between objects flexible. Especially in situations where the other object of the collaboration changes dynamically, if the changing object and the object monitoring it can perform an information exchange similar to the "awareness" in human communication and can autonomously execute processing, it can serve as an effective processing model between collaborating objects on the network. This is because the "awareness" model defines a loosely coupled relationship in object collaboration and creates the flexibility and possibility of dynamic change in the collaboration between objects.

In the second configuration mentioned above, considering human communication and human behavior for collaborating with each other, there is the bidding model, in which a request is made towards an unspecified number of humans, and based on the proposals made in response to such a request and the conditions of the proposals, the person that is most suitable is determined objectively.

If the "awareness" model of the first configuration and the "bidding" model of the second configuration are realized simultaneously, it is possible to realize a distributed processing system, based on object collaboration, that can optimally allocate resources using an unspecified number of objects, without being conscious about the individual objects that are resources on the network.

In order to solve the problems of the prior art, an object collaboration apparatus in accordance with the present invention comprises:

a plurality of objects, each object comprising a message receiving portion for monitoring and obtaining a message transmitted over a network; a reaction table for storing an action content which is a reaction to the message, and wherein a reaction relationship of messages and actions defined in the reaction table drives the object collaboration apparatus, and an action executing portion for executing processing in accordance with the action content;

a requesting message sending portion for sending a requesting message in which an object that initiates a task requests processing of the task from other objects;

a bidding portion for returning a bidding message if an action corresponding to the task that is requested in a requesting message is present in the reaction table;

a bid awarding portion for determining, from among objects returning a bidding message, an object to which processing of the task is assigned; and a bid awarding notifying portion for notifying the selected object of a bid awarding determination.

If there are a plurality of competing objects that can provide an action in response to the task request by executing an action in response to the requested task when receiving a bid awarding notification, the selected object, of which task processing is requested, is determined by a bidding system.

With this configuration, collaboration between objects can be performed flexibly and dynamically with a high degree of freedom, and distributed processing with collaboration between an unspecified number of objects becomes possible. There is no need for a program change of objects or for recompilation, which was necessary for a change of collaboration of objects in the past, and the design of systems using such object collaboration can be performed more efficiently. Moreover, it is possible to detect objects that can provide processing resources with regard to a request by bidding, and, based on the bidding content, to select the most suitable object to be entrusted with the processing and award it the bid.

It is preferable that the bid awarding portion uses, as one bid determining parameter, a communication time that is necessary for communication between the task initiator object and the objects sending the bidding message, and preferentially awards a bid to an object that has a short communication time between objects.

With this configuration, it is possible to select the object with the shortest communication time, which is one condition for performing efficient distributed processing, and to perform distributed processing of task with object collaboration, which is especially useful for the distributed processing of tasks where the processing steps require the distribution of large amounts of data.

It is preferable that the bid awarding portion uses, as one bid object determining parameter, an empirical value of past processing performances for similar tasks of the objects sending a bidding message, and preferentially awards a bid to an object that is expected to have a high processing performance for the requested task.

With this configuration, it is possible to select the object from which processing with the most resources can be expected as the bid-winning object, judging from empirical values of processing performance with regard to the same task, and without exactly knowing the content of the object initiating the request for distributed processing.

It is preferable that the bidding portion includes, in a bidding value, a bidding parameter that shows its own condition with respect to a task for which the bidding portion returns a bidding message, and the bid awarding portion determines a bid-winning object using the bidding value as one of the bid determining parameter.

With this configuration, it is possible to give consideration to the current state of objects, such as the current load of the CPU, the consumption of memory, and their network environment, when selecting the bid-winning object, so that the object collaboration can be changed and adjusted dynamically.

It is preferable that the bidding portion sends the bidding message using, as one bidding parameter, processing resources that can be assigned to a requested task processing, and the bid awarding portion selects an object having a bidding value indicative of large processing resources that can be assigned, and preferentially awards a bid to the selected object as the bid-winning object.

With this configuration, it is possible to select the object that can provide the most processing resources for the requested task at the time of bidding, so that the processing of the requested task can be performed with high efficiency.

It is preferable that the bidding portion sends the bidding message using, as one bidding parameter, an object load ratio showing a ratio of the already assigned processing resources to the bidding object's original processing resources, and the bid awarding portion selects, from the object load ratios in the bidding values, an object having a small load that is already assigned, and preferentially awards a bid to the selected object as the bid-winning object.

With this configuration, it is possible to give consideration to the current load of the object so that the highest load can be concentrated in the object with the most processing resources, and, as a result, a drop of the processing resources can be avoided, and it is possible to perform distributed processing with optimal distribution of resources of over the network.

It is preferable that the bidding portion sends the bidding message using, as one bidding parameter, a computer load ratio indicating a ratio of the already assigned processing resources to the processing resources of a computer that is executing the bidding object, and the bid awarding portion selects, from the computer load ratios in the bidding values, an object that is executed on a computer having a small load that is already assigned, and preferentially awards a bid to the selected object as the bid-winning object.

With this configuration, it is possible to give consideration to the current load of the CPUs of the computer systems where the objects are realized, when selecting the bid-winning object, so that a drop of the processing resources resulting from an excessive load ratio on a CPU serving as a resource for the objects can be avoided, and it is possible to perform distributed processing with dynamic and optimal distribution of resources of over the network.

It is preferable that the bidding portion sends the bidding message using, as one bidding parameter, a skillfulness at the task, which is based on resources available to the bidding object, and the bid awarding portion selects an object that is good at processing the requested task, and preferentially awards a bid to the selected object as a bid-winning object.

With this configuration, it is possible to give consideration to the resources of an application that an object uses, and to give consideration to the "skillfulness", which describes whether an object is good at a requested task, so that it is possible to select, as the bid-winning object, the object that is most suitable for distributed processing of the requested task.

It is preferable that the task initiator object has a bidding portion that generates a bidding message in response to the requesting message sent by the task initiator object, and the bid awarding portion processes the bid awarding selecting an object in accordance with bidding messages sent from both other objects and a bidding messages from the own terminal's bidding portion and selects the most appropriate object for the task processing from among all objects including itself.

With this configuration, it is possible to subjectively select with the bidding method, as the bid-winning object, the most suitable object with the lowest processing costs for performing the requested task processing, from among all the objects on the network, regardless whether the its terminal is identical to the one initiating the request for task processing or not, so that distributed processing can be performed with optimal object collaboration.

In a computer-readable recording medium storing a program for realizing an object collaboration apparatus according to the present invention, the program realizes a plurality of objects, each object comprising steps of monitoring and obtaining a message transmitted over a network; storing a reaction table for storing an action content which is a reaction to the message, wherein a reaction relationship of messages and actions defined in the reaction table drives the object collaboration apparatus; and executing processing in accordance with the action content;

a requesting message sending step for sending a requesting message in which an object that initiates a task requests processing of the task from other objects;

a bidding step for returning a bidding message if an action corresponding to the task that is requested in a requesting message is present in the reaction table;

a bid awarding step for determining, from among objects returning a bidding message, an object to which processing of the task is assigned in the bidding step; and a bid awarding notifying step for notifying the recipient object of a bid awarding determination in the bid awarding step.

If there are a plurality of competing objects that can provide an action in response to the task request by executing an action in response to the requested task when receiving a bid awarding notification, the bid-winning object, of which task processing is requested, is determined by a bidding system.

With this configuration, it is possible to realize the object collaboration apparatus of the present invention at low cost and effort by reading a program for realizing the object collaboration apparatus from a recording medium according to the present invention, using, for example, a personal computer.

BRIEF DESCRIPTION OF THE DRAWINGS

FIG. 4 is a drawing illustrating an example of the reaction table 203.

FIG. 9 is a drawing illustrating an example of the assembled requesting message in accordance with the present invention.

FIG. 10 is a drawing illustrating an example of the reaction table 703 in the service object 502 in accordance with the present invention.

FIG. 11 is a drawing illustrating an example of the message format in accordance with the present invention.

FIG. 14 is a drawing illustrating an example of the call for proposal message, reaction table and propose message used in the object collaboration apparatus in the first embodiment of the present invention.

FIG. 17 is a drawing illustrating an example of the call for proposal message, reaction table and propose message used in the object collaboration apparatus in the second embodiment of the present invention.

FIG. 18 is a flowchart outlining the processing operation in the object collaboration apparatus in the second embodiment of the present invention.

FIG. 20 is a drawing illustrating an example of the call for proposal message, reaction table and propose message used in the object collaboration apparatus in the third embodiment of the present invention.

FIG. 21 is a flowchart outlining the processing operation in the object collaboration apparatus in the third embodiment of the present invention.

DESCRIPTION OF THE PREFERRED EMBODIMENTS

Figure 1:
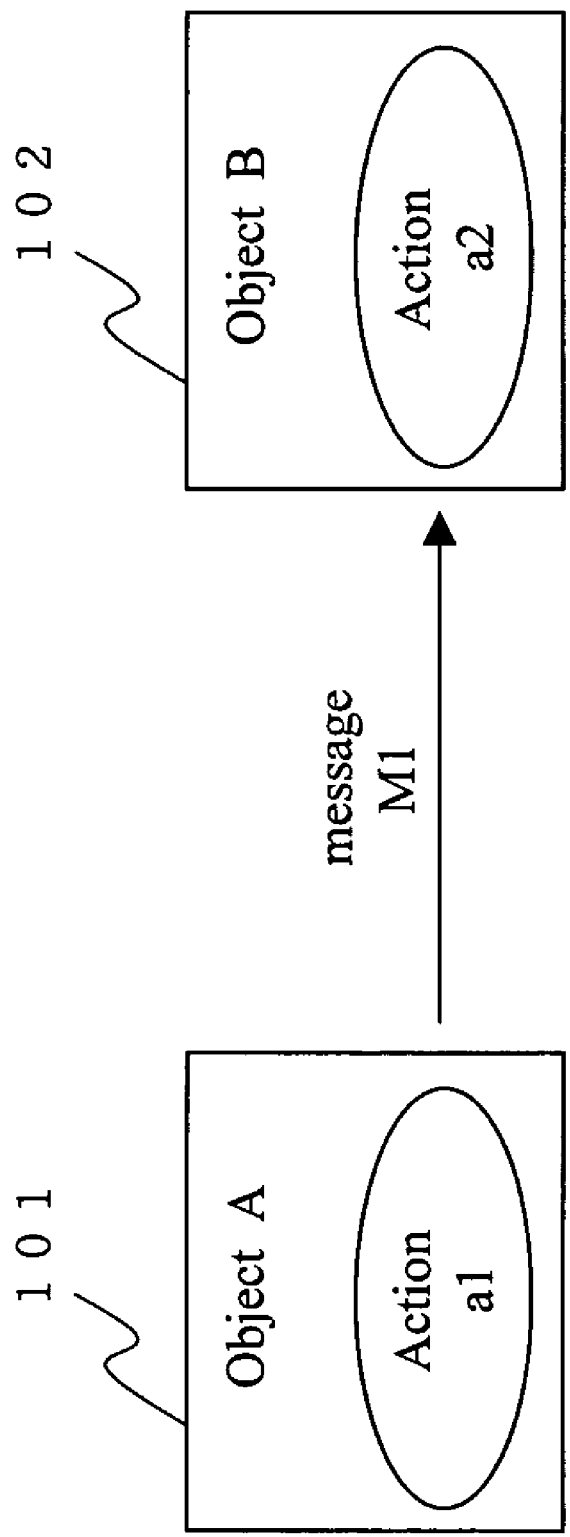
FIG. 1 is a schematic drawing of the loosely coupled collaboration between objects in the "awareness" analogy with respects to the basic principle in accordance with the present invention.

The present invention relates to an object collaboration apparatus which distributedly processes tasks while maintaining a high degree of flexibility and freedom for such collaboration processing as communication, interactions and cooperation between distributed objects. The first configuration is to process many kinds of information as messages flowing in communication channels defined as common fields, using a message action reaction model in which individual computer systems or individual application programs operating in a computer system, serving as objects, react independently, and then to flexibly change an operation of the entire system by changing the relationship between a message and an action. The second configuration is to select an object for a task by using a bidding system. More specifically, a task initiator object sends a requesting message (i.e. call for proposal message) over the network, and objects that can offer to process the task reply with a bidding message (i.e. proposal message) in response to that requesting message. The task initiator object selects the most appropriate object and replies with the bid awarding message (i.e. proposal accepting message) to the bid-winning object among the objects.

Firstly, the following is an explanation of the message action reaction model of the first configuration. The present invention dynamically constructs functions by way of object collaboration that define the relationship as loosely coupled collaboration of objects not the relationship as tightly coupled collaboration where the objects depends on the internal conditions and functions each other.

The message action reaction model according to the present invention can be better understood with the "awareness model" seen in human communication and collaboration behaviors. The present invention presupposes that information processing similar to the "awareness" existing between human individuals is performed by collaboration among distributed objects, and that the objects cooperate based on the detected "awareness." The following is an explanation of the collaboration of distributed objects based on the "awareness" analogy as presupposed in the object collaboration apparatus according to the present invention. Then, an explanation of a system that makes the collaboration of distributed objects more flexible is described together with specific embodiments.

The following is an explanation of the collaboration of distributed objects based on the "awareness" analogy. The collaboration of distributed objects or computers based on the "awareness" analogy can be realized by the following configuration.

1. "Awareness" messages are being shared or "broadcasted."
2. Objects that receive an "awareness" message have their own specified relationship between messages and actions.
3. In objects that send or receive the "awareness" message, the relationship between messages and actions is separate.

Taking advantage of the nature of the "awareness" analogy, which is that a message and an action are separated or can be separated, makes it possible to add the two important elements of participation and interference as an interaction between objects, thus increasing the degree of freedom for the collaboration between objects or between computers connected to the network.

FIG. 1 is a schematic diagram of the loosely coupled collaboration between objects in the "awareness" analogy. In this diagram, objects, a message and action portions of the objects are illustrated schematically.

In FIG. 1, numeral 101 indicates an object A and numeral 102 indicates an object B. Both objects are entities which send and receive "awareness" messages. M1 indicates an "awareness" message. a1 indicates an action specified in the object A (101) and a2 indicates an action specified in the object B (102). The arrow in FIG. 1 indicates a message transmission in which the starting point is an object, and it shows a message reception in which the ending point is an object. In addition, each object has its own action depending on its internal condition.

In FIG. 1, the object A (101) and the object B (102) cooperate via the message M1. In the "awareness" analogy, the object A (101) sends out a message basically without being concerned with the object B (102) or the internal function of the object B (102). Also, the object A (102) does not have to specify the object B (102) to send out a message. The object A (101) sends out the message M1 based on its own condition and processing contents. The object B (102) monitors messages flowing in the communication channel, and when it detects the message M1, it reacts with the action a2. In this way, the object A and the object B can collaborate smoothly, though this is not by a direct connection between the object A and the object B, but by a connection between the message M1 and the action a2 of the object B. On the contrary, when the message is not M1, the object B (102) does not react unless it has another action corresponding to such a different message. Accordingly, since the objects collaborate loosely coupled via messages, the degree of freedom of the collaboration between the objects increases. In other words, there is no need for specifying the address of the participant object and the content for the processing request as in conventional computer network communication systems, "awareness" messages indicating object conditions and processing results are circulated on the network. Each terminal monitoring the network detects the messages, and reacts autonomously to them if a corresponding action is specified. This object collaboration becomes loosely coupled, not tightly coupled collaboration system via messages M1.

In this way, the present invention takes advantage of the fact that making the collaboration between objects a simple information exchange instead of a functional exchange as conventional systems enables the information to be freely interpreted by a participant. A network on which a plurality of objects are connected is utilized for a communication channel as a shared field among objects. Each object sends out processing requests on the communication channel in the form of simple message (call for proposal message). And, each object receives the processing request flowing in the communication channel in form of simple message, and individually reacts to the information. Thus, a collaboration system with a higher degree of freedom can be constructed.

In other words, the structures for sending and for receiving messages are standardized. A shared field in which the message flows freely between objects is prepared. Each object is provided with means for monitoring the information flowing in the shared field and an information reaction table, which associates the information to react to with an action to execute. Consequently, of all the information flowing in the shared field, each object can react only to the message recorded in its own reaction table and execute the action associated with that message.

The above is the basic principle of the message action reaction model of the first configuration of the present invention and of the collaboration between the distributed objects based on the "awareness model."

Next, assuming the first configuration of the present invention, the following is an explanation of a distributed processing of a task by the collaboration between objects using a bidding system as the second configuration of the present invention.

Figure 2:
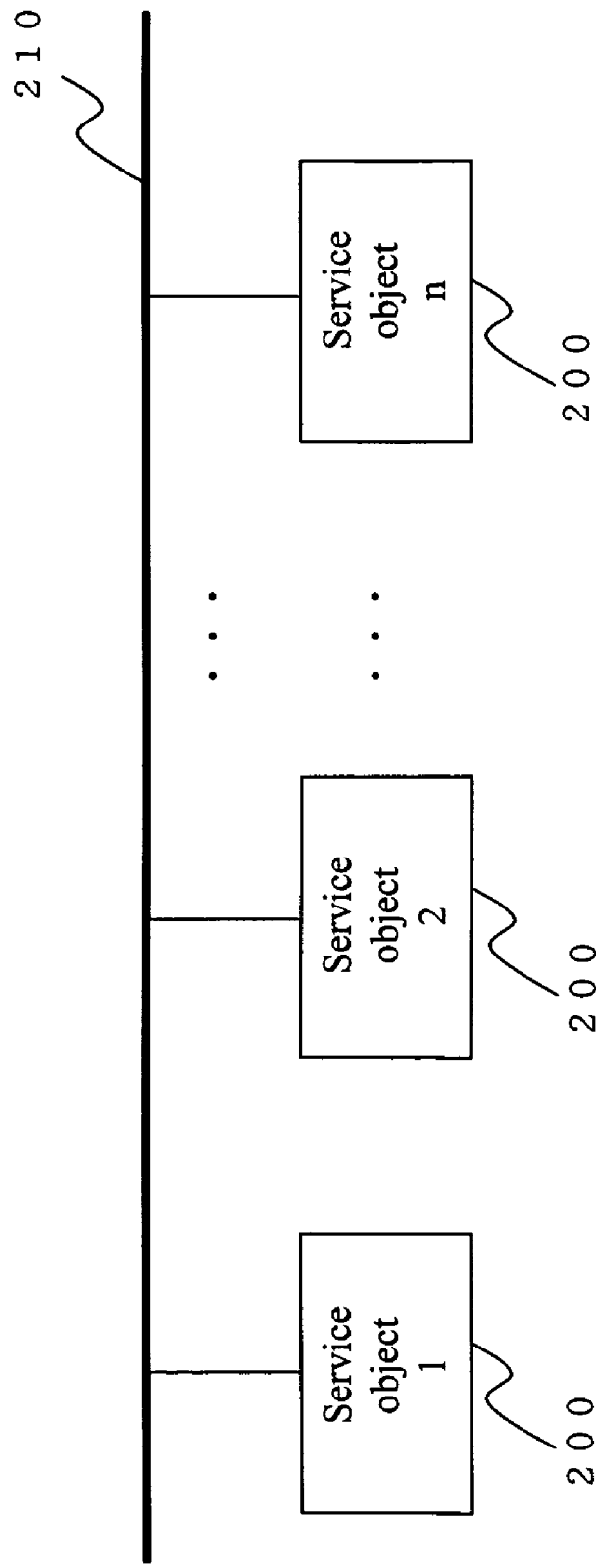
FIG. 2 is an outline of the entire object collaboration apparatus in accordance with the present invention.
Figure 3:
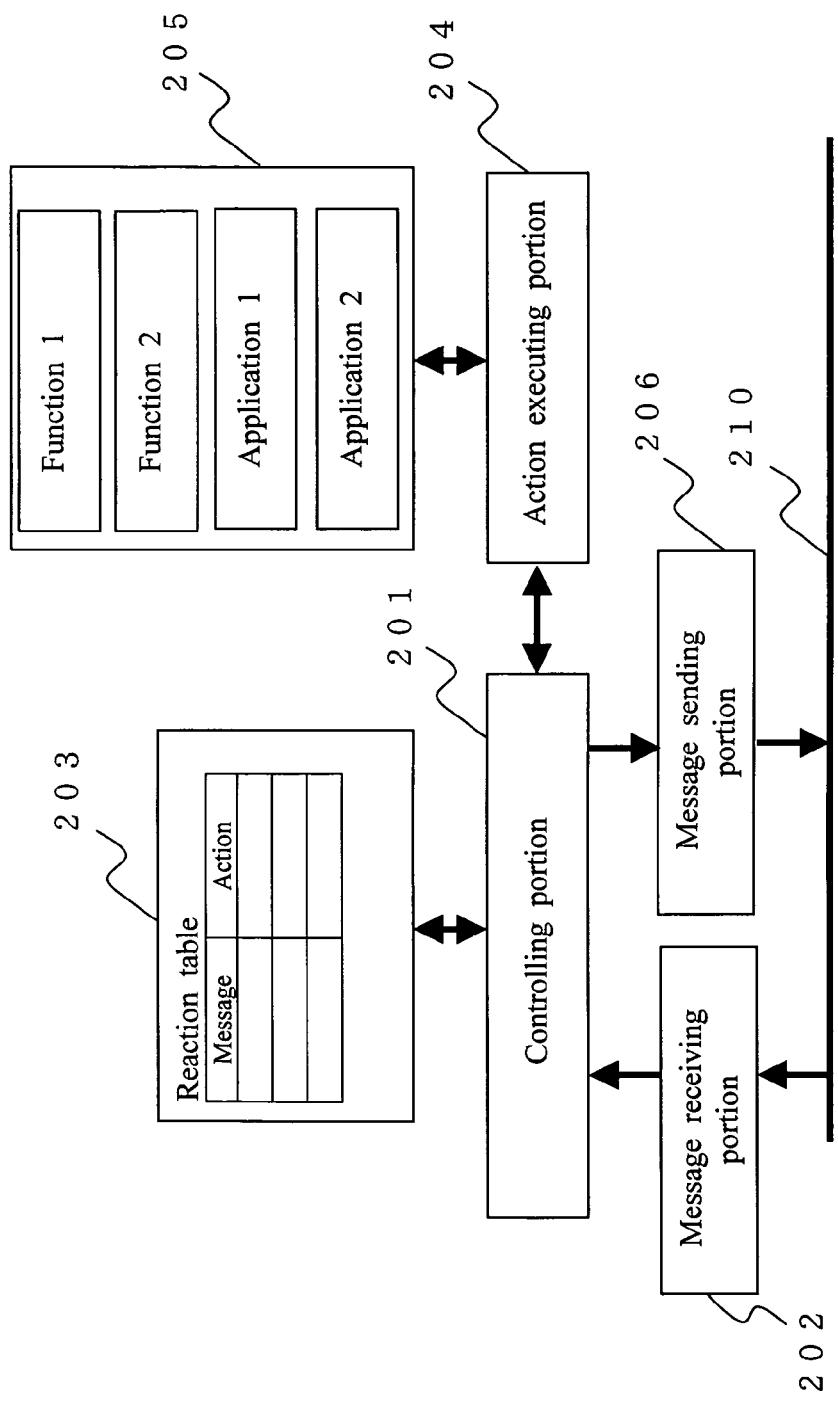
FIG. 3 is a drawing illustrating elements within one service object in accordance with the present invention.

FIG. 2 shows an outline of an entire object collaboration apparatus according to the present invention. FIG. 3 shows the elements within one service object.

Numeral 200 denotes service objects as the objects. Numeral 210 denotes a network serving as a shared communication channel. Numeral 201 denotes a controlling portion. Numeral 202 denotes a message receiving portion. Numeral 203 denotes a reaction table. Numeral 204 denotes an action executing portion. Numeral 205 denotes functions and applications managed by the action executing portion. Numeral 206 denotes a message sending portion.

The message receiving portion 202 receives a bit stream flowing in the shared communication channel and transforms it into a message. The message format includes four different slots containing a subject, a verb, an object 1 and an object 2.

FIG. 4 shows an example of the reaction table 203, which lists corresponding messages and actions. As is shown in FIG. 4, the table includes pairs of functions which are actions corresponding to messages. A plurality of such pairs are stored in the table. An arbitrary character string can be put into any slot of subject, verb, object 1 and object 2. Also, "*" indicates a "wild card" that can stand for any character string. A received message refers to this table and calls the function that executes the desired action. For example, "AddItem" is an external function overwrite message, and has the information of a function in the object 1 and a pattern to be recorded in the reaction table 203 in the object 2. When this message is received, an add function is called and then actual overwriting is carried out.

The above is the basic principle of the message action reaction model of the first configuration.

Next, the following is an explanation of a collaboration between objects using a bidding model as the second configuration, constructed under the assumption of the message action reaction model mentioned above.

Figure 5:
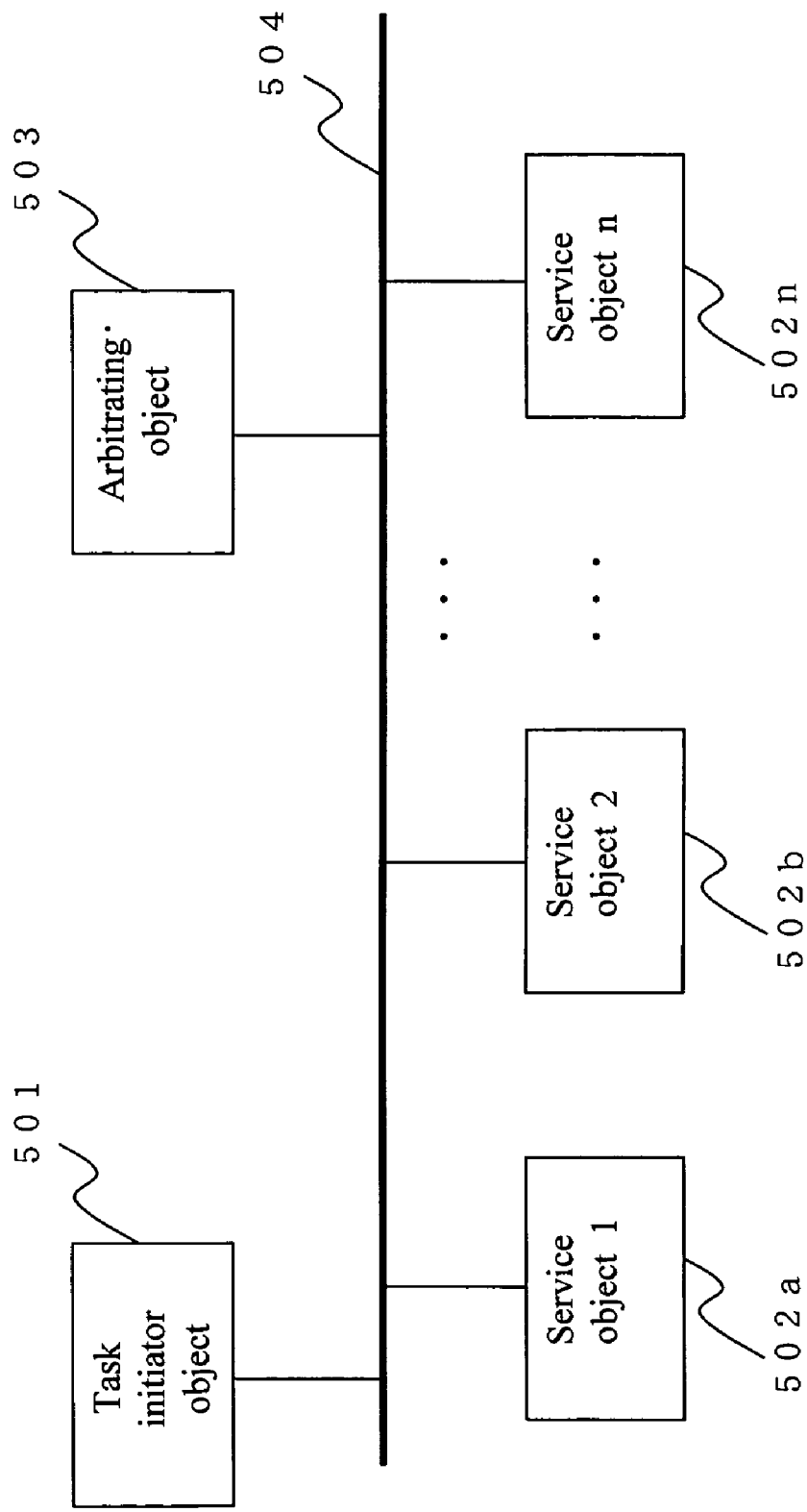
FIG. 5 is a an outline of the collaboration between objects by the bidding system model in accordance with the present invention.

FIG. 5 shows an outline of the collaboration between objects in the bidding model.

Numeral 501 denotes a task initiator object. Numeral 502 denotes service objects that can provide a task processing service and make a bidding message (i.e. proposal message) that corresponds to a task requesting message (i.e. call for proposal message). Numeral 503 shows an arbitrating object that, when bidding messages (proposal messages) are sent by more than one service object, selects a one service object from those service objects and send a bid awarding message (i.e. proposal accepting message) to it the selected service object. Numeral 504 denotes a shared communication channel. In FIG. 5, the arbitrating object 503 is separate from the task initiator object 501, but the arbitrating object 503 also can be a part of the task initiator object 501 as a bid awarding portion, so that the task initiator object 501 itself carries out arbitration and bid awarding (i.e. proposal accepting).

Figure 6:
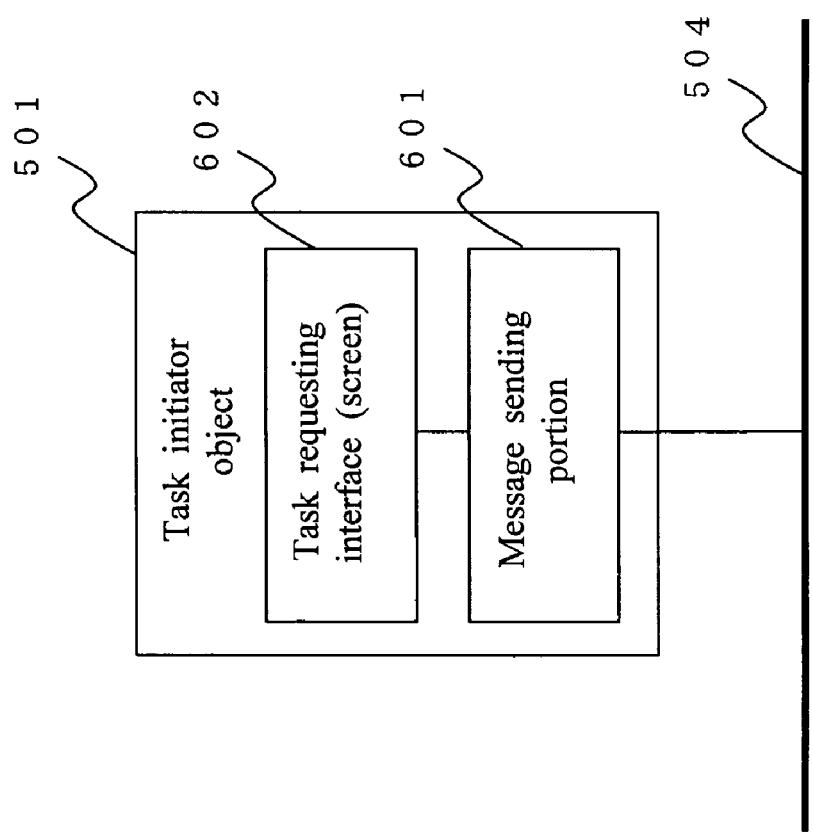
FIG. 6 is a block diagram showing an internal structure of the task initiator object 501 in accordance with the present invention.
Figure 7:
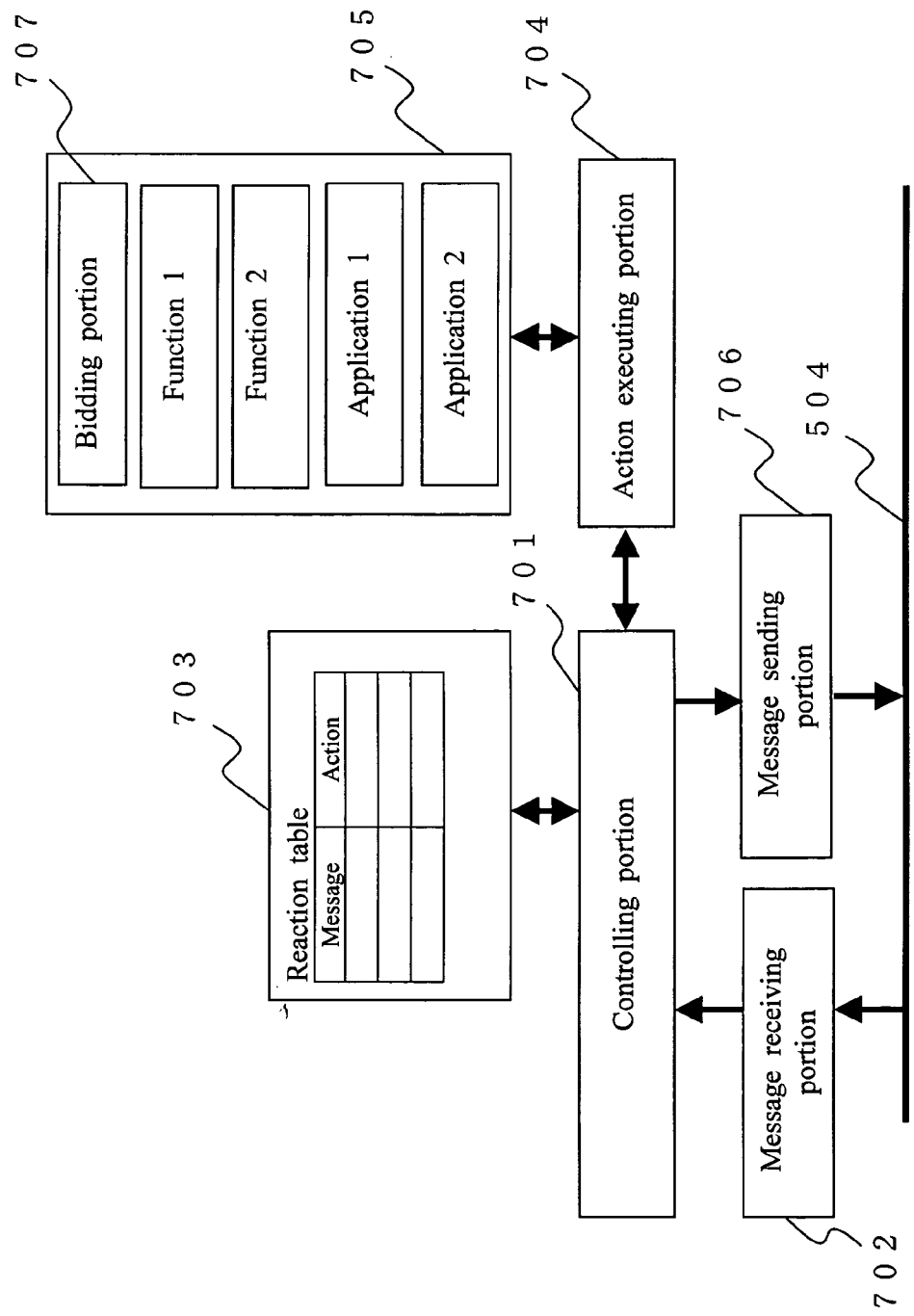
FIG. 7 is a block diagram showing an internal structure of the service object 502 in accordance with the present invention.
Figure 8:
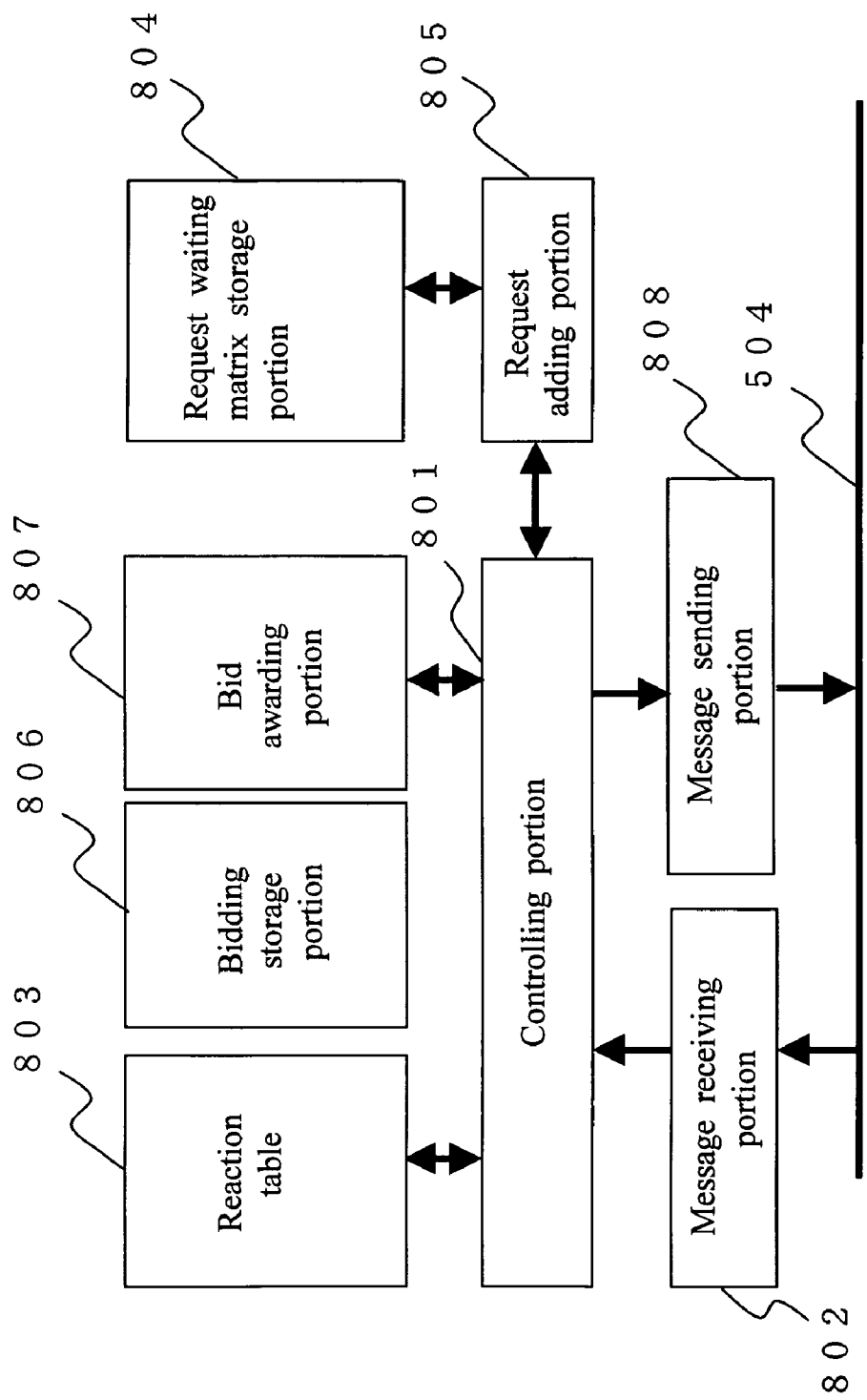
FIG. 8 is a block diagram showing an internal structure of the arbitrator object 503 in accordance with the present invention.

FIG. 6 is a block diagram showing the internal structure of the task initiator object 501. FIG. 7 is a block diagram showing the internal structure of the service objects 502. FIG. 8 is a block diagram showing the internal structure of the arbitrating object 503.

In FIG. 6, which is a block diagram showing the internal structure of the task initiator object 501, numeral 601 denotes a message sending portion. Numeral 602 denotes a task request interface, which provides a user interface. By the request of a user specified through the task request interface 602, the message sending portion 601 assembles a requesting message (call for proposal message) and sends it into the shared communication channel 504. FIG. 9 is an example of such an assembled requesting message (call for proposal message).

In FIG. 7, which is a block diagram showing the internal structure of the service object 502, numeral 701 denotes a controlling portion. Numeral 702 denotes a message receiving portion. Numeral 703 denotes a reaction table storing the action content corresponding to the requesting messages (call for proposal messages). Numeral 704 denotes an action executing portion which executes a task for which processing is requested. Numeral 705 denotes functions and applications managed by the action executing portion. Numeral 706 denotes a message sending portion for sending bidding messages (proposal messages). Numeral 707 denotes a bidding portion that, when an action corresponding to a received requesting message (call for proposal message) is contained in the reaction table 703, returns a bidding message (proposal message). In short, the service object shown in FIG. 2 is provided with a bidding portion 707.

The reaction table 703 contains actions corresponding to messages and judges to which message passing through the shared communication channel 504 it should react. FIG. 10 shows an example of the reaction table 703. "*" in the table is a wild card that reacts to any character string. In the example of FIG. 10, as is explained in the following, a bid processing is performed as an action in response to the requesting message (call for proposal message) "query." Also, an action, which is the execution of a task, is listed as corresponding to the "service object ID" indicating the awarding of a bid (i.e. accepting of a proposal).

A bidding portion 707 of the service object 502 performs the bid processing when it reacts to a requesting message (call for proposal message), and calculates a bidding value for the bidding. The bidding value can be, for example, a weight according to the current load of the service object. A bidding message (proposal message) including the bidding value is sent to the shared communication channel 504 via the message sending portion 706. FIG. 11 shows an example of the sent message format.

An action executing portion 704, which is a function interface for executing a service actually provided by that module, executes a service command.

In FIG. 8, which is a block diagram showing the internal structure of the arbitrating object 503, numeral 801 denotes a controlling portion. Numeral 802 denotes a message receiving portion. Numeral 803 denotes a reaction table storing action content corresponding to messages. Numeral 804 denotes a storage portion for a request waiting matrix which registers service requests sent from initiator objects. Numeral 805 denotes a request adding portion, which registers the service request messages (call for proposal messages) sent from the initiator object into the request waiting matrix storage portion 804. Numeral 806 denotes a bid storage portion, which accepts bidding messages (proposal messages) and stores the bidding messages (proposal information) until the bid is awarded. Numeral 807 denotes an awarding portion which determines a selected object according to the bidding message (proposal message) registered in the bidding messages storage portion 806. Numeral 808 denotes a message sending portion, which sends out a bid awarding message (i.e. proposal accepting message) with the bidding result.

Figure 12:
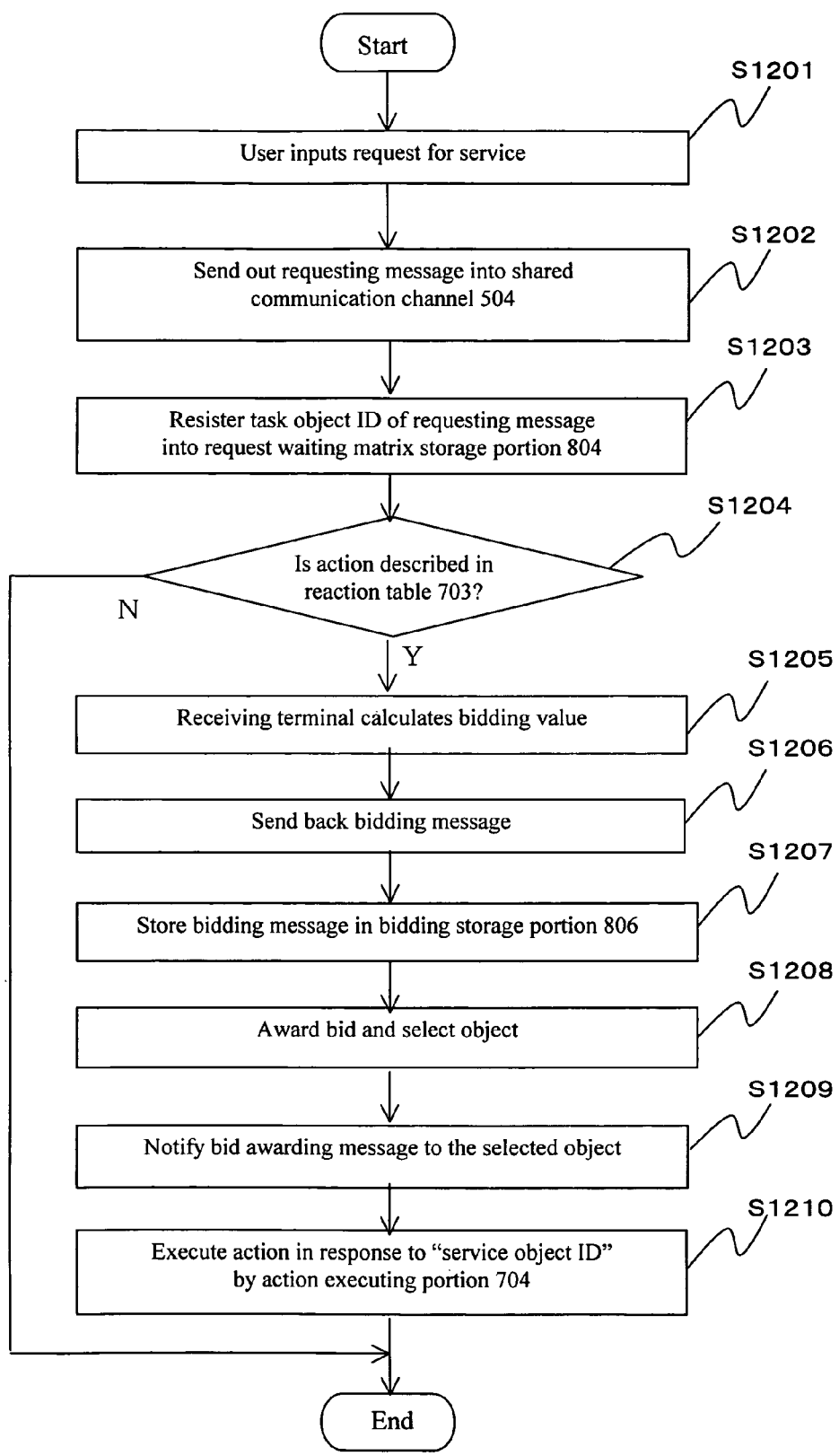
FIG. 12 is a flowchart of the basic flow of processing operation of the object collaboration apparatus in accordance with the present invention.

The following is an explanation of a basic flow of the processing operation of an object collaboration apparatus according to the present invention, with reference to the flowchart shown in FIG. 12.

First, a user requests a service via the task request interface 602 in task initiator object 501 (step S1201). Based on a task assignment obtained with the task request interface 602, the task initiator object 501 sends a requesting message (call for proposal message) into the shared communication channel 504 via the message sending portion 601 (step S1202). The message format in this case is shown in FIG. 9. For example, an ID for a request requesting message (call for proposal message) can be "query 1." This requesting message (call for proposal message) reaches all the objects since it flows in the shared communication channel 504.

The requesting message (call for proposal message) "query 1" reaches each service object 502 and arbitrating object 503. The arbitrating object 503 registers a task object ID1 of the received requesting message (call for proposal message) into the request waiting matrix storage portion 804 with the request adding portion 805 (step S1203). On the other hand, based on the accepted requesting message (call for proposal message), the service object 502 refers to the reaction table 703 shown in FIG. 10, and checks whether a corresponding action is listed (step S1204). When making a bid in response to the requesting message (call for proposal message) and composing a bidding message (proposal message), the service object 502 calculates a bidding value (step S1205). The bidding value is calculated based on a load ratio of the object according to a bidding system described below. The service object 502 returns the bidding message (proposal message) composed on the basis of the calculated bidding value (step S1206).

The bidding message (proposal message) is sent from the message sending portion 706 into the shared communication channel 504. The arbitrating object 503 receives the bidding message (proposal message) according to the reaction table 803. The received bidding message (proposal message) is stored in the bidding storage portion 806 (step S1207).

When there is a plurality of objects reacting to the requesting message (call for proposal message) and a plurality of bidding messages (proposal messages) are received within a certain period of time, those messages are stored in the bidding storage portion 806.

Then, the awarding portion 807 in the bidding object awards the bid and selects a prospective object from the plurality of objects (step S1208). The bid awarding (the proposal accepting) is performed objectively, using bidding value, bidding orders and communication time as parameters, in accordance with a bidding system described below.

The awarding portion 807 selects an object by a bidding process, sends a bid an awarding message (proposal accepting message) to the selected object via the message sending portion 808 (step S1209). For example, the bid awarding message (proposal accepting message) comprises information such as "service object ID," which can specify an action content, as a subject, and "get" expressing the awarding of a bid as a predicate, as is shown in FIG. 11(*b*).

At the same time that the awarding portion 807 sends out the bid awarding message (proposal accepting message), it deletes the registered "service object ID" from the waiting matrix in the request waiting matrix storage portion 804.

The selected object receives the bid awarding message (proposal accepting message indicating the bid awarding result, and executes the action with the action executing portion 704 in response to the "service object ID" in the bid awarding message (proposal accepting message) with reference to the reaction table 703 (step S1210).

The above is the basic principle of distributed processing of a task by collaboration between objects, using a bidding system of the second configuration of the present invention.

In the operation of an entire object collaboration apparatus using the bidding system described above, processing of a service load is distributed among the service objects 502 on the network. The distribution of the load begins from the moment when the service objects 502 are dynamically put onto the network. Therefore, no special settings are necessary.

In the following, the parameters for the bidding system used in the bidding processing in step S1204 and the bid awarding processing in step S1206 described above are explained.

One bidding system makes its decision using the communication time between objects as a parameter. In other words, in the bidding process, this system awards the bid to an object resulting in the shortest communication time between objects. The communication time is determined by the communication ability of the object, the communication speed of the network path and the distance on the network in the case of distant communication. The requesting message (call for proposal message) reaches service objects 502, which are distributed on the network, via the network. At this moment, service objects in positions on the network with faster communication receive the message earlier, while service objects in distant positions on the network with slower communication receive the message later. Even if an object sends out a bidding message (proposal message) right after it has received a requesting message (call for proposal message), the bidding messages (proposal messages) reach a bid awarding object in an order depending on the communication time between the objects. The network speed is not only determined by its capacity, but changes according to the communications traffic from moment to moment. Conventionally, it was almost impossible to distribute tasks considering this communications traffic. However, this system makes it possible to distribute tasks according to the network speed without complex settings and without a special system.

Another bidding system is to determine a selected object using an empirical value of processing performance for processing similar tasks in the past as a parameter. In other words, this system preferentially selects an object that can be expected, from experience, to have high processing performance for the task, and awards the bid to this object. Although the processing performance of the object changes from moment to moment according to the CPU load amount, forecasting of the processing performance based on empirical values from the past can serve as a reliable measure. Therefore, efficient distributed processing of the requested task can be expected. In addition to such achievements as the processing performance and processing time in the past, the empirical value can also give consideration to how many times similar tasks were requested in the past.

In other words, the bidding weight is determined according to how many times a bid was awarded (call for proposal was accepted) in the past. Then, each service object holds a count value, which is increased every time a bid is awarded (call for proposal is accepted). When bidding, the bidding weight is changed with reference to this count value. In terms of the overall operation, the more a service object has been awarded in the past, the more it is likely to be awarded for the bid because the count rate increases with experience. With such a system, it becomes easier to award a service bidding according to past experience. Thus, specific service requests are processed by objects with high experience.

Another bidding system is that a bidding parameter that shows the own terminal's condition with respect to a task put up for bidding is included as a bidding value in the bidding message (proposal message), and an awarding portion 807 determines an object using this bidding value as one of the parameters for determining the object.

The "own terminal's condition" refers to the processing resources that a terminal can assign to the processing of the requested task. Thus, a bid can be awarded to the object that has the most processing resources available at the time of bidding.

In addition, another parameter indicating the "own terminal's condition" is the object load ratio, which expresses a ratio of the already assigned processing resources to the total bidding object's original processing resources. In other words, if the other load executed by the bidding object (proposing object) is large, the bidding object (proposing object) is not regarded as an appropriate object to be accepted and its priority is lowered, because the resources that it can assign to the requested task processing become smaller, and also because it can influence the other load. Still another parameter indicating the own terminal's condition is a computer load ratio, indicating a ratio between the already assigned processing resources of the computer executing the bidding object (proposing object) and the overall processing resources of that computer. In other words, if the CPU load of the computer on which the bidding object (proposing object) is running is large, the bidding object (proposing object) is not regarded as an appropriate object to be accepted and its priority is lowered, because the resources that can be assigned to the requested task become smaller, and also because it can influence the other load.

In order to detect the load, each object sends the bidding message (proposal message) with delay corresponding to the processor load. The processor load can be obtained by executing a process A having the lowest priority. In this process A, counting is conducted by making use of the memory region. In another process B, this count is retrieved and reset at regular intervals, in order to obtain the count values at these regular intervals. When the processor is "busy" with a process with higher priority, process A will be unable to count. Since process A has the lowest priority, the count values can be regarded as a measure for the entire load. Depending on the computer type, or even among computers of the same type, the computer's load changes from moment to moment. A load distribution taking this into account used to be very difficult, but the present invention makes it possible to distribute loads without any special software or setting.

Another bidding system uses the skillfulness of a bidding object (proposing object) at a requested task, based on the resources available to the bidding object (proposing object), as one of the parameters for selecting an object. In other words, the processing efficiency of the requested task depends on the application used by the object. Whether the application is good or bad at processing the requested task is defined as "skillfulness" and is included in the parameters to be considered in the bid awarding process (proposal accepting process). Such bid awarding (proposal accepting) considering the skillfulness makes it possible to select an object as a bid-winning object that uses an application that is appropriate for processing the requested task.

Another bidding system is that a task initiator object itself also has a bidding portion 707 and makes a bid (proposal), and a bid awarding portion 807 selects an object in accordance with bidding messages (proposal messages) sent out by objects of the own terminal and of other terminals. In order to process a task, it is possible to select the object with the highest processing efficiency among all the resources on the network.

In the distributed processing of a task according to the bidding systems described above, it is preferable that the requesting object itself runs and provides the desired service when no service object makes a bid (proposal) for the task processing request requesting message (call for proposal message). With such a system, a service which is not available by bidding becomes available, or a service which is not available because of other computer's load ratio becomes available, the load can be autonomously distributed more flexible.

The following is a description of an operation of an object collaboration apparatus according to the present invention, with reference to specific examples of distributed processing.

First Embodiment

The first embodiment describes an object collaboration apparatus in which, in an environment where accessible hard disks are distributed on the network, data can be stored regardless of disk capacity by introducing a method for dynamically determining a hard disk to store data.

Figure 13:
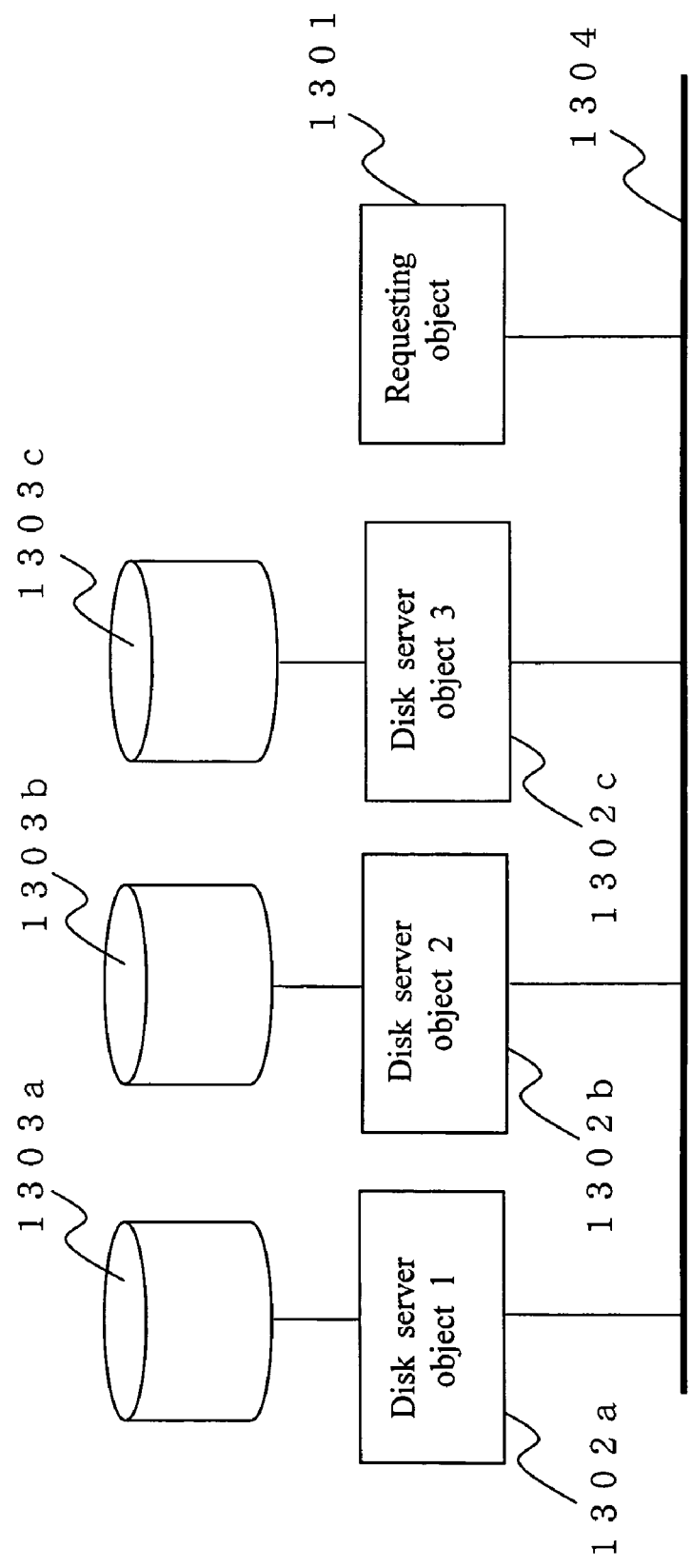
FIG. 13 is a block diagram outlining the object collaboration apparatus which dynamically decides a hard disk to store data in the first embodiment of the present invention.

FIG. 13 shows a block diagram outlining an object collaboration apparatus, which dynamically determines a hard disk to store data on. In FIG. 13, numeral 1301 denotes a terminal as a requesting object. Numeral 1302 denotes a disk server object. Numeral 1303 denotes a hard disk. Numeral 1304 denotes a shared communication channel. The requesting object 1301 and the disk server object 1302 monitor the same shared communication channel 1304.

Figure 15:
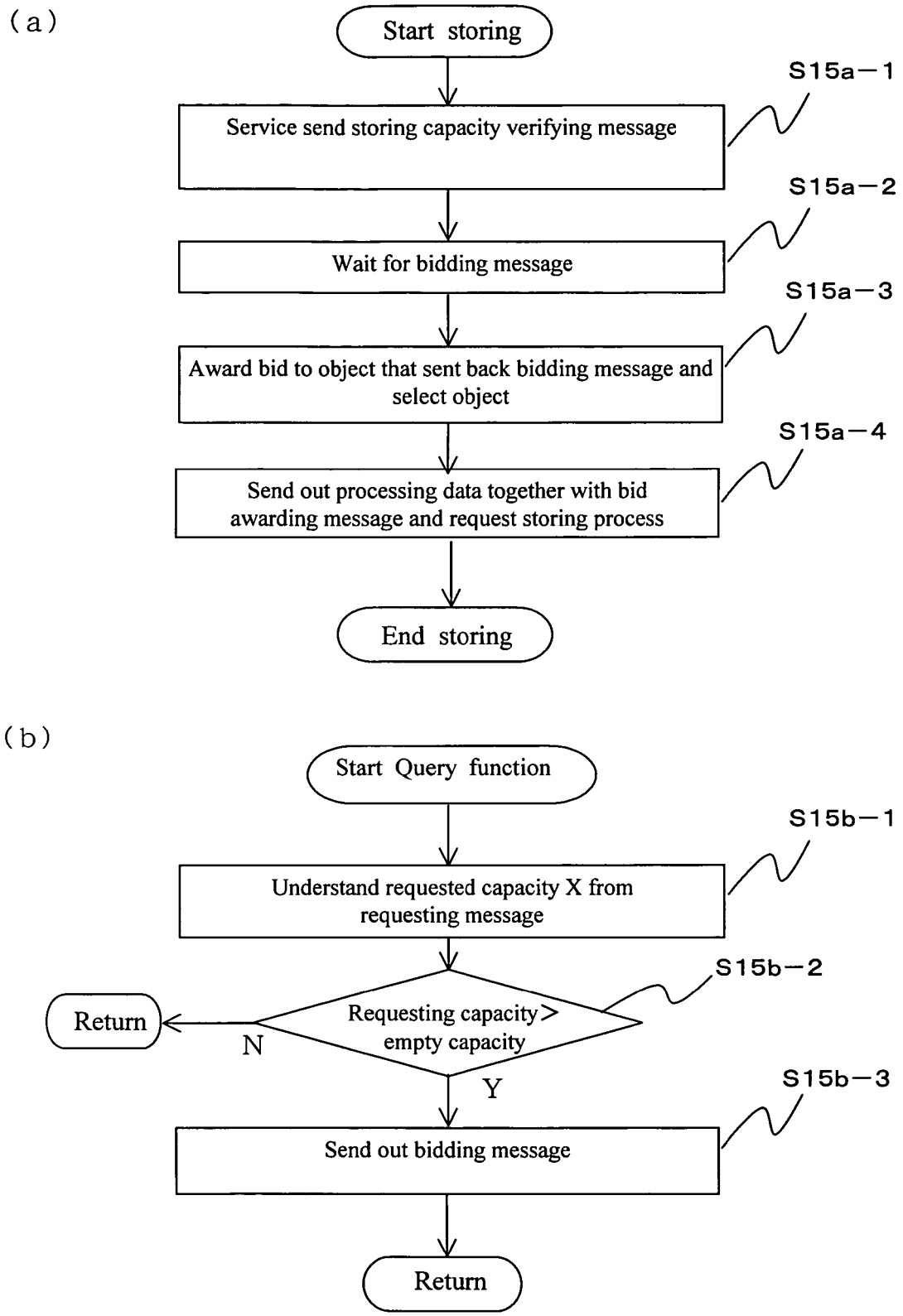
FIG. 15 is a flowchart outlining the processing operation in the object collaboration apparatus in the first embodiment of the present invention.

When the terminal 1301 wants to store X megabyte of data, it sends out a requesting message (call for proposal message) [terminal ID, query, X, *], as shown in FIG. 14(a), into the shared communication channel 1304. Each disk server object 1302 has the reaction table 703 shown in FIG. 14(b), which reacts to the requesting message (call for proposal message). If an empty capacity of the hard disk 1303 is larger than X megabyte, a bidding message (proposal message), for example, [server object ID, bid, disk ID, empty capacity] is returned, as shown in FIG. 14(c). The terminal 1301 that is the requesting object selects a disk server object as the bid-winning object from among the disk server objects 1302a–1302c that returned the bidding messages (proposal message) and then awards the bid (the proposal is accepted). For example, the terminal 1301 that is the requesting object selects the disk server object having the largest empty capacity (1302c). The requesting object sends out the data to be stored together with a bid awarding message (proposal accepting message) to the disk server object 1302c which has become the selected object. This operation is illustrated in the flowchart in FIG. 15.

With such an object collaboration apparatus which dynamically determines a hard disk for storing data, a disk having an appropriate capacity can be selected automatically, and the user does not have to be directly aware of the disk where the data is stored. Also, since the requesting message (call for proposal message) reaches all the resources connected on the network, the terminal 1301 that is the requesting object does not have to keep track of what kind of recording media are on the network. Also, when installing a new disk, there is no need for complex settings or an announcement to the users, which used to be necessary in conventional network management systems. In addition, as the remaining capacity of a disk can be used as one of the bid awarding parameters, recording capacity resources on the entire network can be fully utilized.

Second Embodiment

The second embodiment describes an object collaboration apparatus which efficiently utilizes CPU resources distributed over a network.

Figure 16:
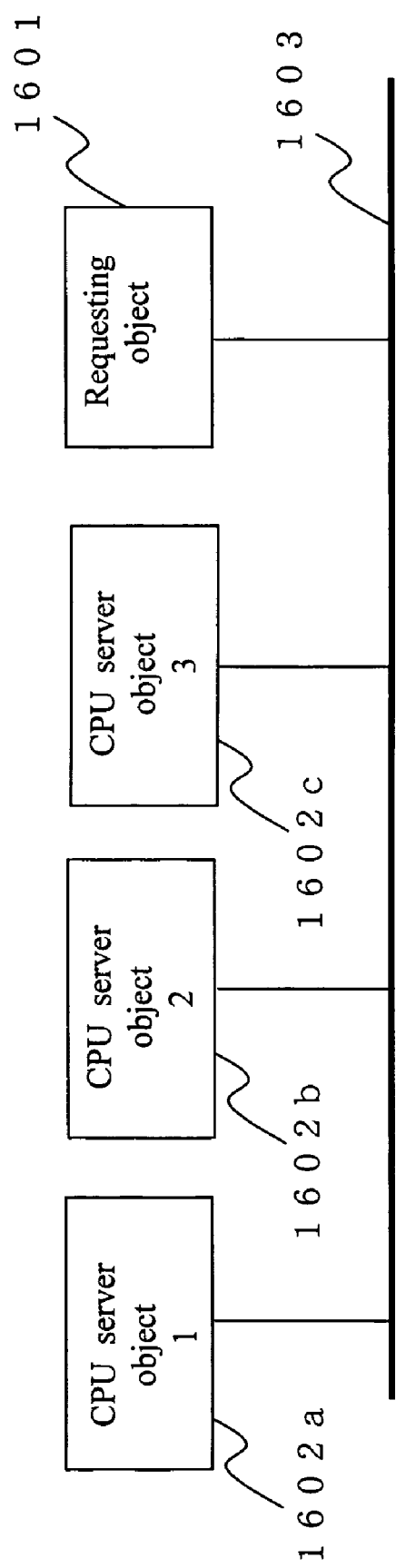
FIG. 16 is a block diagram outlining the object collaboration apparatus which makes use of CPU resources distributed on a network in the second embodiment of the present invention.

FIG. 16 is a block diagram outlining an object collaboration apparatus in accordance with the second embodiment, which efficiently utilizes CPU resources distributed over a network. In FIG. 16, numeral 1601 denotes a terminal that is a requesting object. Numeral 1602 denotes a CPU server object. Numeral 1603 denotes a shared communication channel. The requesting object 1601 and the CPU server object 1602 monitor the same shared communication channel 1603.

When the terminal 1601 wants to do a large load calculation, it sends out a requesting message (call for proposal message) [terminal ID, query, x,], shown in FIG. 17(a), into the shared communication channel 1603. Each CPU server object 1602 has the reaction table 703 shown in FIG. 17(b), and in response to the requesting message (call for proposal message), the CPU server object returns a bidding message (proposal message) [server object ID, bid, CPU server ID, CPU power] shown in FIG. 17(c), which has the CPU power, indicating CPU processing resources, as a parameter. The terminal 1601 which is the requesting object selects a CPU server object from among the CPU server objects 1602a–1602c that have returned the bidding messages (proposal message), and then awards the bid. For example, the terminal 1601 selects the CPU server object with the largest processing resources (1602c). The requesting object sends out an application code and processing data together with a bid awarding message (accepting message) to the CPU server object 1602c that has become the bid-winning object. The CPU server object 1602c that has become the bid-wining object executes the application code, processes the received data, and returns the results to the initiator object 1601. This operation is illustrated in the flowchart in FIG. 18.

In addition to this, in the above configuration, sending out the requesting message (call for proposal message) with the application code and then returning the bidding message (proposal message) with processing resources including the skillfulness at the application make it possible to conduct efficient distributed processing suitable for the requested processing content. For example, for such operations as vector calculations, three-dimensional matrix calculations or rendering calculations, special purpose machines have specialized processing resources. Therefore, this skillfulness can serve as an important parameter when requested.

Since this object collaboration apparatus efficiently utilizes the CPU resources distributed on the network, users can share resources such as CPUs and memories on the network with other users, thereby efficiently utilizing them. Also, computers having unused processing resources at the time of request can be selected dynamically and automatically. The user does not have to be directly aware of the CPU server object that is the bid-winning object, and autonomous load distribution becomes possible. Also, since requesting messages (call for proposal messages) reach all the resources connected on the network, the terminal 1602, which is the requesting object, does not have to keep track what kind of CPUs and memories or other resources are on the network, and when newly installing a resource such as a CPU, there is no need for complex settings and announcements to the user, which used to be necessary in conventional network management systems. In addition, as the processing resources of CPUs can be used as one of the bid awarding parameters, it is possible to utilize the processing resources of the entire network.

Third Embodiment

The third embodiment describes an object collaboration apparatus that utilizes WWW (world wide web, referred to as "WWW" in the following) server resources distributed on a network.

Figure 19:
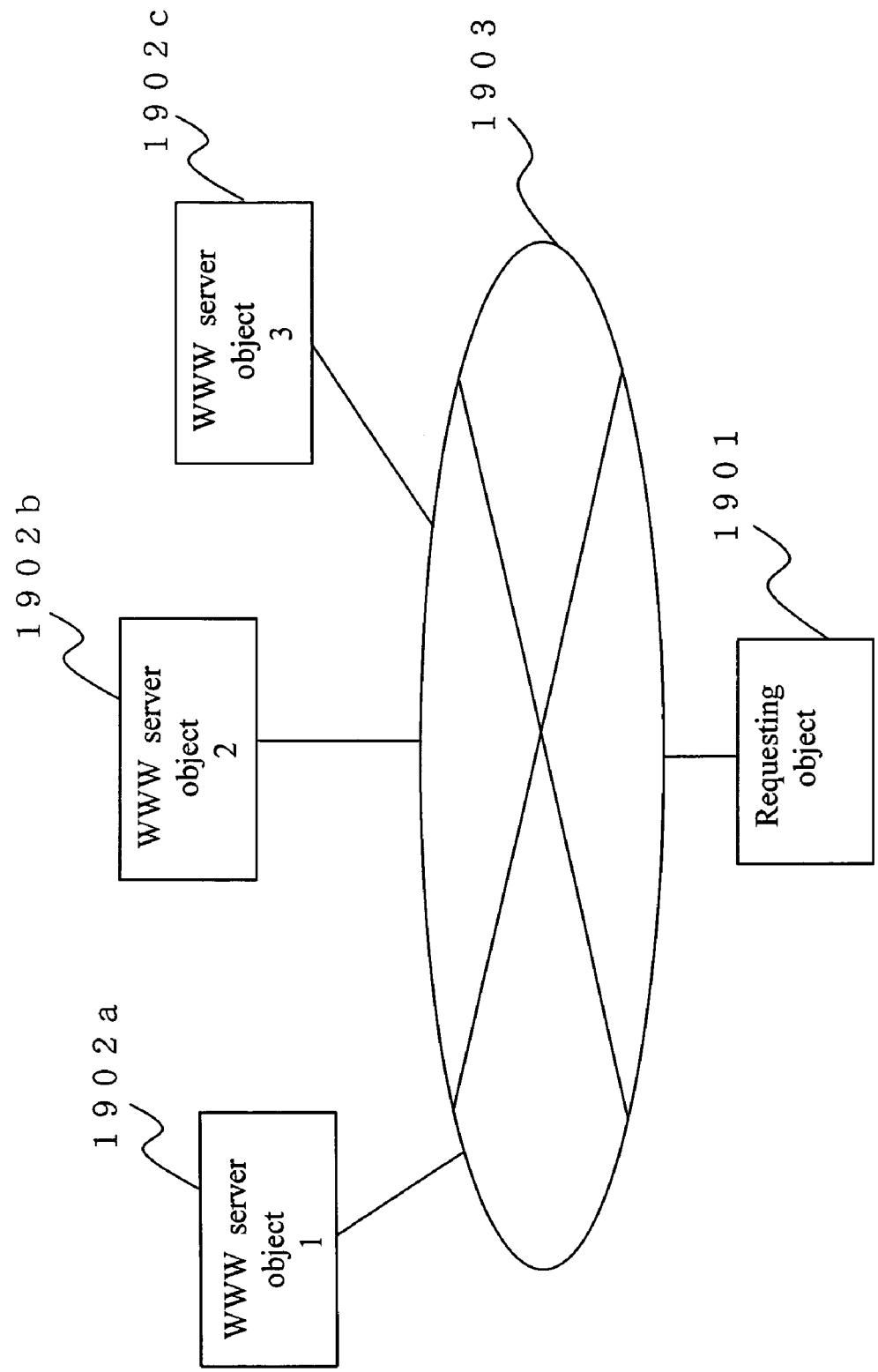
FIG. 19 a block diagram outlining the object collaboration apparatus which makes use of WWW server resources distributed on a network in the third embodiment.
Figure 22:
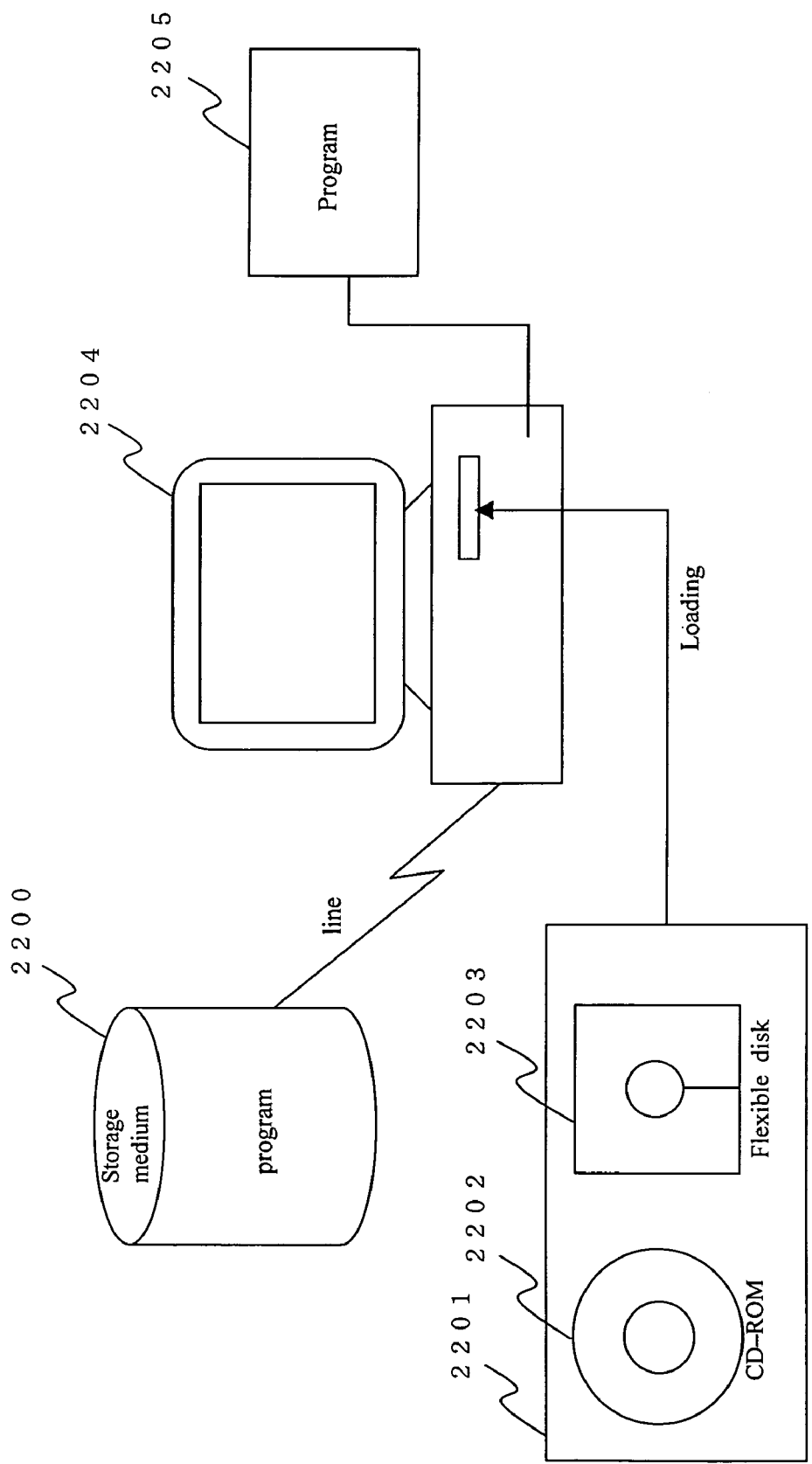
FIG. 22 is a drawing of examples for recording medium.
Figure 23:
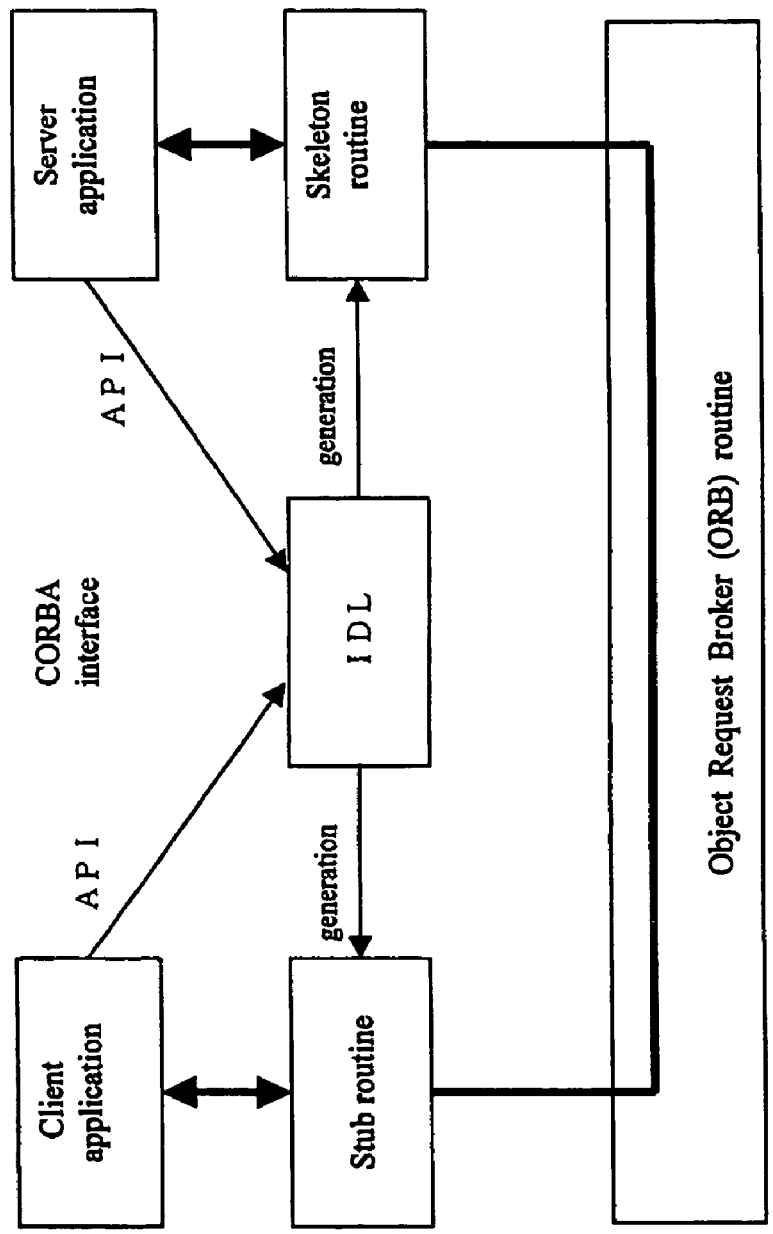
FIG. 23 is a drawing of an example of the object collaboration in a client/server system according to CORBA of the prior art.

FIG. 19 shows a block diagram outlining an object collaboration apparatus in accordance with the third embodiment, which utilizes WWW server resources distributed on a network. In FIG. 19, numeral 1901 denotes a WWW client terminal that is a requesting object. Numeral 1902 denotes a WWW server object. Numeral 1903 denotes a network. The requesting object 1901 and the WWW server object 1902 are connected via the network 1903.

When the terminal 1901 wants to connect the desired URL (universal resource locator) and retrieve data, it sends out a requesting message (call for proposal message) [terminal ID, query, x], as shown in FIG. 20(a), onto the network 1903. Each WWW server object has a reaction table 703 shown in FIG. 20(b), which reacts to the requesting message. Then, the WWW server object returns a bidding message (proposal message) [server object ID, bid, WWW server ID, *] as shown in FIG. 20(c). The WWW client terminal 1901 that is the requesting object selects a WWW server object as a bid-winning object (an accepted object) from among the WWW server objects 1902a–1902c that returned the bidding messages (proposal messages) and then awards the bid (accepts the proposal). For example, the WWW client terminal that is the requesting object selects the WWW server objects having the shortest communication time (1902c). The requesting object sends out the retrieval conditions and information on the data to be downloaded, together with a bid awarding message (proposal accepting message), to the WWW server object 1902c that has become a bid-winning object. The WWW server object 1902c that has become the bid-winning object processes the received data and returns the results to the initiator object 1901. This operation is shown in the flowchart in FIG. 21.

With this object collaboration apparatus, which utilizes WWW server resources distributed on the network, the communication time can be used as one of the bid awarding parameters, so a user can connect to the WWW server object that provides services with the quickest response. The user does not have to be directly aware of the CPU server object that becomes the bid-wining object, and autonomous load distribution becomes possible. Also, when newly installing a resource such as WWW server, complex settings and announcements to users, which used to be regarded as necessary in the conventional network management, are not necessary.

Fourth Embodiment

The object collaboration apparatus according to the present invention can be constructed by computers of several types by recording a program, containing the processing steps for realizing the configurations explained above, on a computer-readable recording medium. The recording medium, on which the program providing the processing steps realizing the object collaboration apparatus according to the present invention is recorded, can be not only a portable recording medium 2201 such as a CD-ROM 2202 or a flexible disk 2203, but also a recording medium 2200 in a recording apparatus on the network or a recording medium 2205 such as a hard disk or a RAM. When executing the program, the program is loaded into a computer 2204 and executed in its main memory.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

The invention claimed is:

1. An object collaboration apparatus, comprising:
    a computer comprising:
        a plurality of object-oriented data structures comprising objects, each object comprising:
            a message receiving portion to monitor and obtain a requesting message transmitted over a network by another of the objects,
            a reaction table to store an action content which is a reaction to said requesting message, wherein a reaction relationship of requesting messages and respective actions defined in the reaction table drives the object collaboration apparatus, and
            an action executing portion to execute processing in accordance with the action content;
        a requesting message sending portion to send a requesting message in which the object initiates a task by requesting processing of the task from other objects;
        a bidding portion to automatically generate and return a bidding message responsive to a requesting message if an action corresponding to the task that is requested in the requesting message is present in the reaction table, where the bidding message is a bid for the object to process the requested task;
        a bid awarding portion to automatically determine, from among objects returning a bidding message, an object to which processing of the task is assigned, wherein:
            said bid awarding portion uses, as one bid determining parameter, a communication time that is necessary for communication between the task initiator object and the objects sending the bidding message, and preferentially awards a bid to an object that has a short communication time between objects;
        a bid awarding notifying portion to notify the selected object of a bid awarding determination; and
        a bidding system determining the selected object, of which task processing is requested, if there are a plurality of competing objects responding to the requested task when receiving a bid awarding notification.

2. An object collaboration apparatus, comprising:
    a computer comprising:
        a plurality of object-oriented data structures comprising objects, each object comprising:
            a message receiving portion to monitor and obtain a requesting message transmitted over a network by another of the objects,
            a reaction table to store an action content which is a reaction to said requesting message, wherein a reaction relationship of requesting messages and respective actions defined in the reaction table drives the object collaboration apparatus, and
            an action executing portion to execute processing in accordance with the action content;

a requesting message sending portion to send a requesting message in which the object initiates a task by requesting processing of the task from other objects;

a bidding portion to automatically generate and return a bidding message responsive to a requesting message if an action corresponding to the task that is requested in the requesting message is present in the reaction table, where the bidding message is a bid for the object to process the requested task;

a bid awarding portion to automatically determine, from among objects returning a bidding message, an object to which processing of the task is assigned, wherein:

said bid awarding portion uses, as one bid determining parameter, an empirical value of past processing performances for similar tasks of the objects sending a bidding message, and preferentially awards a bid to an object that is expected to have a high processing performance for the requested task;

a bid awarding notifying portion to notify the selected object of a bid awarding determination; and a bidding system determining the selected object, of which task processing is requested, if there are a plurality of competing objects responding to the requested task when receiving a bid awarding notification.

3. An object collaboration apparatus, comprising:

a computer, comprising:

a plurality of object-oriented data structures comprising objects, each object comprising:

a message receiving portion to monitor and obtain a requesting message transmitted over a network by another of the objects, a reaction table to store an action content which is a reaction to said requesting message, wherein a reaction relationship of requesting messages and respective actions defined in the reaction table drives the object collaboration apparatus, and an action executing portion to execute processing in accordance with the action content;

a requesting message sending portion to send a requesting message in which the object initiates a task by requesting processing of the task from other objects;

a bidding portion to automatically generate and return a bidding message responsive to a requesting message if an action corresponding to the task that is requested in the requesting message is present in the reaction table, where the bidding message is a bid for the object to process the requested task, wherein:

said bidding portion includes, in a bidding value, a bidding parameter that shows its own condition with respect to a task for which said bidding portion returns a bidding message, and said bidding portion sends the bidding message using, as one bidding parameter, processing resources that can be assigned to a requested task processing;

a bid awarding portion to automatically determine, from among objects returning a bidding message, an object to which processing of the task is assigned, wherein:

said bid awarding portion determines a bid-winning object using the bidding value as one bid determining parameter, and said bid awarding portion selects an object having a bidding value indicative of large processing resources that can be assigned, and preferentially awards a bid to the selected object as the bid winning object;

a bid awarding notifying portion to notify the selected object of a bid awarding determination; and a bidding system determining the selected object, of which task processing is requested, if there are a plurality of competing objects responding to the requested task when receiving a bid awarding notification.

4. An object collaboration apparatus, comprising:

a computer, comprising:

a plurality of object-oriented data structures comprising objects, each object comprising:

a message receiving portion to monitor and obtain a requesting message transmitted over a network by another of the objects, a reaction table to store an action content which is a reaction to said requesting message, wherein a reaction relationship of requesting messages and respective actions defined in the reaction table drives the object collaboration apparatus, and an action executing portion to execute processing in accordance with the action content;

a requesting message sending portion to send a requesting message in which the object initiates a task by requesting processing of the task from other objects;

a bidding portion to automatically generate and return a bidding message responsive to a requesting message if an action corresponding to the task that is requested in the requesting message is present in the reaction table, where the bidding message is a bid for the object to process the requested task, wherein:

said bidding portion includes, in a bidding value, a bidding parameter that shows its own condition with respect to a task for which said bidding portion returns a bidding message, and said bidding portion sends the bidding message using, as one bidding parameter, an object load ratio showing a ratio of the already assigned processing resources to the bidding object's original processing resources;

a bid awarding portion to automatically determine, from among objects returning a bidding message, an object to which processing of the task is assigned, wherein:

said bid awarding portion determines a bid-winning object using the bidding value as one bid determining parameter, and said bid awarding portion selects, from the object load ratios in the bidding values, an object having a small load that is already assigned, and preferentially awards a bid to the selected object as the bid-winning object;

a bid awarding notifying portion to notify the selected object of a bid awarding determination; and a bidding system determining the selected object, of which task processing is requested, if there are a plurality of competing objects responding to the requested task when receiving a bid awarding notification.

5. An object collaboration apparatus, comprising:

a computer, comprising:

a plurality of object-oriented data structures comprising objects, each object comprising:

a message receiving portion to monitor and obtain a requesting message transmitted over a network by another of the objects, a reaction table to store an action content which is a reaction to said requesting message, wherein a reaction relationship of requesting messages and respective actions defined in the reaction table drives the object collaboration apparatus, and an action executing portion to execute processing in accordance with the action content;

a requesting message sending portion to send a requesting message in which the object initiates a task by requesting processing of the task from other objects;

a bidding portion to automatically generate and return a bidding message responsive to a requesting message if an action corresponding to the task that is requested in the requesting message is present in the reaction table, where the bidding message is a bid for the object to process the requested task, wherein:

said bidding portion includes, in a bidding value, a bidding parameter that shows its own condition with respect to a task for which said bidding portion returns a bidding message, and said bidding portion sends the bidding message using, as one bidding parameter, a computer load ratio indicating a ratio of the already assigned processing resources to the processing resources of a computer that is executing the bidding object;

a bid awarding portion to automatically determine, from among objects returning a bidding message, an object to which processing of the task is assigned, wherein:

said bid awarding portion determines a bid-winning object using the bidding value as one bid determining parameter, and said bid awarding portion selects, from the computer load ratios in the bidding values, an object that is executed on a computer having a small load that is already assigned, and preferentially awards a bid to the selected object as the bid-winning object;

a bid awarding notifying portion to notify the selected object of a bid awarding determination; and a bidding system determining the selected object, of which task processing is requested, if there are a plurality of competing objects responding to the requested task when receiving a bid awarding notification.

6. An object collaboration apparatus, comprising:

a computer, comprising:

a plurality of object-oriented data structures comprising objects, each object comprising:

a message receiving portion to monitor and obtain a requesting message transmitted over a network by another of the objects, a reaction table to store an action content which is a reaction to said requesting message, wherein a reaction relationship of requesting messages and respective actions defined in the reaction table drives the object collaboration apparatus, and an action executing portion to execute processing in accordance with the action content;

a requesting message sending portion to send a requesting message in which the object initiates a task by requesting processing of the task from other objects;

a bidding portion to automatically generate and return a bidding message responsive to a requesting message if an action corresponding to the task that is requested in the requesting message is present in the reaction table, where the bidding message is a bid for the object to process the requested task, wherein:

said bidding portion includes, in a bidding value, a bidding parameter that shows its own condition with respect to a task for which said bidding portion returns a bidding message, and said bidding portion sends the bidding message using, as one bidding parameter, a skillfulness calculated based on a processing efficiency of the requested task depending on an application;

a bid awarding portion to automatically determine, from among objects returning a bidding message, an object to which processing of the task is assigned, wherein:

said bid awarding portion determines a bid-winning object using the bidding value as one bid determining parameter, and said bid awarding portion selects an object that is good at processing the requested task, and preferentially awards a bid to the selected object as the bid-winning object;

a bid awarding notifying portion to notify the selected object of a bid awarding determination; and a bidding system determining the selected object, of which task processing is requested, if there are a plurality of competing objects responding to the requested task when receiving a bid awarding notification.

* * * * *

UNITED STATES PATENT AND TRADEMARK OFFICE
CERTIFICATE OF CORRECTION

PATENT NO. : 6,988,272 B1 Page 1 of 1
APPLICATION NO. : 09/407307
DATED : January 17, 2006
INVENTOR(S) : Tadashige Iwao et al.

It is certified that error appears in the above-identified patent and that said Letters Patent is hereby corrected as shown below:

Column 18, Line 14, after "computer" insert -- , --.
Column 18, Line 55, after "computer" insert -- , --.

Signed and Sealed this

Eighteenth Day of July, 2006

JON W. DUDAS
*Director of the United States Patent and Trademark Office*